United States Patent
Graylin et al.

(10) Patent No.: US 10,560,774 B2
(45) Date of Patent: Feb. 11, 2020

(54) HEADSET MODE SELECTION

(71) Applicant: ONVOCAL, INC., Northborough, MA (US)

(72) Inventors: William Wang Graylin, Winchester, MA (US); John Maddox, Northborough, MA (US)

(73) Assignee: OV LOOP, INC., Woburn, MA (US)

(*) Notice: Subject to any disclaimer, the term of this patent is extended or adjusted under 35 U.S.C. 154(b) by 0 days.

(21) Appl. No.: 15/839,119

(22) Filed: Dec. 12, 2017

(65) Prior Publication Data
US 2018/0167715 A1    Jun. 14, 2018

Related U.S. Application Data

(60) Provisional application No. 62/433,456, filed on Dec. 13, 2016.

(51) Int. Cl.
*H04R 1/10* (2006.01)
*G06F 3/16* (2006.01)
*G10K 11/178* (2006.01)

(52) U.S. Cl.
CPC ........... *H04R 1/1041* (2013.01); *G06F 3/165* (2013.01); *H04R 1/1083* (2013.01);
(Continued)

(58) Field of Classification Search
CPC ...... H04R 1/10; H04R 1/1008; H04R 1/1016; H04R 1/1041; H04R 1/08; H04R 1/1083; H04R 1/1091; H04R 1/105; H04R 5/00; H04R 5/033; H04R 5/04; H04R 27/00; H04R 27/02; H04R 27/04; H04R 2227/01; H04R 2227/003; H04R 2420/01; H04R 2420/03; H04R 2420/05; H04R 2420/07; H04R 2420/09; H04R 2430/00; H04R 2430/01; H04R 2430/03; H04R 2430/20; H04R 2430/23; G10K 11/175; G10K 11/178; G10K 11/17833; G10K 11/17835; G10K 11/17837; G10K 11/1785; G10K 11/1783; G10K 11/17827; G10K 11/16; G05B 21/02; G06F 3/16; G06F 3/162; G06F 3/165; G06F 3/167
USPC ... 381/19–23, 309, 310, 311, 26, 28, 56–60, 381/61, 63, 312–321, 71.1, 71.6, 71.8, 381/71.11, 71.12, 71.13, 71.14, 72, 73.1,
(Continued)

(56) References Cited

U.S. PATENT DOCUMENTS

2004/0202339 A1* 10/2004 O'Brien, Jr. ......... H04B 13/005
                                                          381/312
2009/0010444 A1*  1/2009 Goldstein ............... H03G 3/342
                                                          381/66
(Continued)

*Primary Examiner* — Leshui Zhang
(74) *Attorney, Agent, or Firm* — Seyfarth Shaw LLP; Brian Michaelis

(57) ABSTRACT

An audio headset that provides a "chat" mode to temporarily adjusts audio to preset levels to emphasize ambient sound, and includes a beamformer to provide directional speech isolation. The headset may include active noise cancellation and/or passive noise isolation. When entering chat mode, three or more relative audio levels are individually adjusted to presets, allowing the wearer to hear ambient noise and their own isolated voice, while attenuating other audio sources. This user-configurable combination of levels temporarily adjust the mix of signals that will be output to a wearer via the stereo headphone speakers.

14 Claims, 10 Drawing Sheets

(52) U.S. Cl.
CPC ...... *G10K 11/17853* (2018.01); *H04R 1/1066* (2013.01); *H04R 2430/23* (2013.01)

(58) Field of Classification Search
USPC .... 381/74, 79, 80, 81, 82, 83, 85, 332, 334, 381/91, 92, 93, 94.1–94.9, 95, 100, 101, 381/102, 103, 104–115, 118, 119, 120, 381/121, 122, 123; 455/569.1, 569.2, 455/570, 575.2
See application file for complete search history.

(56) References Cited

U.S. PATENT DOCUMENTS

| | | | |
|---|---|---|---|
| 2009/0238377 A1* | 9/2009 | Ramakrishnan | G10L 21/028 381/92 |
| 2010/0215198 A1 | 8/2010 | Ngia et al. | |
| 2011/0206217 A1 | 8/2011 | Weis | |
| 2014/0146976 A1* | 5/2014 | Rundle | H04R 1/1083 381/71.6 |
| 2014/0288927 A1* | 9/2014 | Klug | G10L 21/0208 704/228 |
| 2014/0294191 A1 | 10/2014 | Parkins | |
| 2015/0063599 A1 | 3/2015 | Ring | |
| 2016/0125869 A1 | 5/2016 | Kulavik et al. | |
| 2016/0275961 A1* | 9/2016 | Yu | G10K 11/16 |

* cited by examiner

HEADSET MODE SELECTION

CROSS-REFERENCE TO RELATED APPLICATIONS

This application claims priority to U.S. Provisional Patent Application No. 62/433,456 filed on Dec. 13, 2016, which is incorporated herein by reference in its entirety.

FIELD OF THE INVENTION

The present invention relates to wearable audio headsets that include a microphone, and more particularly, noise-cancelling headphones with active controls.

BACKGROUND

Headsets, which combine mono or stereo headphones with at least one microphone, are commonly used with multimedia devices that support voice-controlled features. They may also be used with telephony devices, and with aviation communication devices, in order to reproduce sounds received as audio signals from these devices, and to capture and transmit spoken utterances from the wearer. Active noise cancelling is sometimes included in the headsets to reduce unwanted ambient sounds using active noise control, in addition to passive noise isolation.

Contemporary headphones and headsets with passive sound isolation and/or active noise-cancelling are manufactured in a variety of form factors, and offer various controls and features. However, the focus of the new design features has been on headphone functionality (e.g., headphone speaker volume, active noise cancellation enable/disable) and remote control of connected source devices (e.g., including call answer, mute, play, pause, and skip controls). Little attention is paid to the processing of signals from the vocal microphone(s) used to pick up a wearer's own speech, as may be used for hands-free telephony or to command a speech-controlled device, and the configurability of relative levels of the different audio signals that may be output by the headsets.

Solutions exist that allow a wearer to hear their surroundings by turning off active noise cancelling and redirecting ambient noise captured by the microphone(s) used for active noise cancellation to the headset speakers. While the wearer can hear their surroundings, this all-or-nothing approach does not provide the headphone wearer the ability to control the mix of ambient noise relative to the media source to which they were listening, and skews how a wearer perceives their own voice relative to ambient sounds, with their own spoken utterances captured by the same microphones used to capture other ambient noises. The resulting perceptual-skew may cause a wearer to speak abnormally loud relative to how they would speak if they were not wearing the headphones.

In addition to providing limited control over what is heard, existing solutions also fail to isolate spoken utterances from other ambient noises. If a wearer's speech is picked up by a noise cancellation microphone, the utterance may be cancelled out like other ambient noises, depriving a headset wearer of the feedback provided by hearing their own voice. In the alternative, if captured speech is picked up by a dedicated microphone and provided as feedback to the wearer through the headphones, captured ambient noise will also be reproduced, thereby defeating the advantage of noise cancellation.

SUMMARY

A headset and method according to the disclosure provides a "chat" mode to temporarily adjust audio to preset levels to emphasize ambient sound. In an embodiment, the headset includes a wearable frame and first and second headphone channels connected to the wearable frame, each headphone channel comprising a speaker and a microphone. The headset also includes a vocal pickup microphone connected to the wearable frame, a button switch that generates a control signal when actuated and signal mixers that mix and output audio signals to the headphone channel speakers. Further, the headset includes a controller that sets a Voice volume level for a voice signal from the vocal pickup microphone input into the signal mixers, a Source volume level for communications or media audio signals input into the signal mixers, and an Ambient volume level for ambient sound signals from the headphone channel microphones input into the signal mixers.

The controller may change a first set of parameter values for the Voice, Source, and Ambient volume levels to a second set of parameter values that are different from the first set in response to receiving a first occurrence of the control signal. Further, the controller may also restore the Voice, Source, and Ambient volume levels to the first set of parameter values in response to receiving a second occurrence of the control signal following the first occurrence.

The headset may include a Voice volume level control interface for signaling the controller to adjust the Voice volume level, a Source volume level control interface for signaling the controller to adjust the Source volume level, and an Ambient volume level control interface for signaling the controller to adjust the Ambient volume level. Accordingly, the controller adjusts the first set of parameter values in response to receiving signaling from the Voice, Source, and/or Ambient volume level control interfaces while the first set of parameters are used for the Voice, Source, and Ambient volume levels. Further, the controller adjusts the second set of parameter values in response to receiving signaling from the Voice, Source, and/or Ambient volume level control interfaces while the second set of parameters are used for the Voice, Source, and Ambient volume levels.

The headset may further include a wireless radio transceiver configured to support a communication link with a device and the controller may adjust the second set of parameter values in response to receiving one or more changes to the second set from a software application executed on the device. When the headset receives the communications or media audio signals from the device via the communication link, the controller sends a first message to the device to pause playback of media corresponding to the media audio signals or to mute communications corresponding to the communications audio signals further in response to receiving the first occurrence of the control signal. In addition, the controller sends a second message to the device to resume playback or unmute communications further in response to receiving the second occurrence of the control signal.

The headset may include a beam former that receives output signals from the vocal pickup microphone and the microphone of at least one of the headphone channels, the beam former configured to provide directional speech isolation, at least partially isolating the voice signal from other sound signals picked up by the vocal pickup microphone.

The headset may include non-volatile memory storage storing the second set of parameter values, wherein the second set of parameter values configure the Voice and Ambient volume levels so that at least some of the voice signal and the ambient sound signals are included in the output audio signals from the signal mixers.

While multiple embodiments are disclosed, including variations thereof, still other embodiments of the present application will become apparent to those skilled in the art from the following detailed description, which shows and describes illustrative embodiments of the application. The application is capable of modifications in various aspects, all without departing from its scope or spirit. The drawings and detailed description are illustrative in nature and not restrictive.

BRIEF DESCRIPTION OF DRAWINGS

For a more complete understanding of the present disclosure, reference is now made to the following description taken in conjunction with the accompanying drawings.

DETAILED DESCRIPTION

Figure 1:
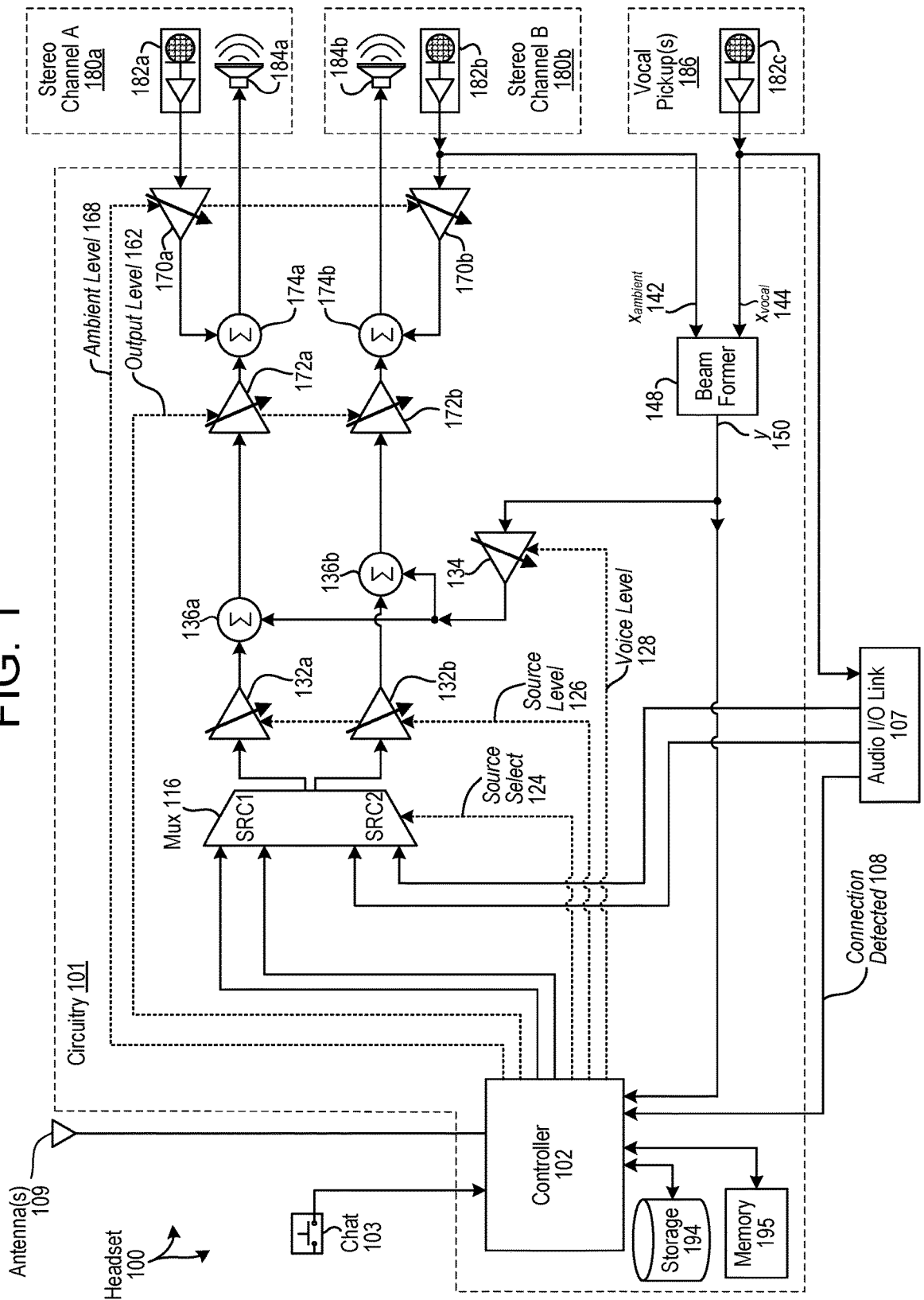
FIG. 1 illustrates is a high-level schematic overview of an improved headset that provides a "chat" mode to temporarily adjust audio to preset levels to emphasize ambient sound, and provide directional speech isolation.

FIG. 1 illustrates is a schematic overview of an improved headset 100 that provides a "chat" mode to temporarily adjust audio to preset levels to emphasize ambient sound, and provide directional speech isolation. The headset 100 may include active noise cancellation and/or passive noise isolation (i.e., soundproofing). When entering chat mode, three or more relative audio levels may be individually adjusted to user-specified preset levels, including a source sound level 126, a voice sound level 128, and an ambient sound level 168. This user-configurable combination of levels temporarily adjust the mix of signals that will be output to a wearer via the stereo headphone speakers 184a and 184b. Chat mode may be used to simultaneously turn down (or off) the source volume, while simultaneously turning on the voice and ambient volumes, all with a press of a button (e.g., 103). When pressing the same button again (e.g., 103), the headset 100 may revert back to the original volume levels of source/ambient/voice as existed before entering chat mode.

The source sound level signal 126 sets the relative level from a sound source, as selected by a multiplexer 116 in accordance with a source select control signal 124 from the controller 102. Examples of source audio include among other things music, other media audio, communication system audio, and telephony audio. In FIG. 1, there are two sources that provide audio to the multiplexer 116: the controller 102 itself and a wired or wireless audio input/output link 107. Although two stereo sources are illustrated, more than two sources may be input into the multiplexer 116, or if there is a single source, the multiplexer 116 and the source select signal 124 may be omitted. Also, instead of two-channel stereo sources, the sources may have a different number of channels. The audio produced by the controller 102 may originate with the controller 102 (e.g., audio prompts and/or audio reproduced from files stored in storage 194) or may be received from a connected device (e.g., from device 401 or a network-connected media server 498 providing media in FIG. 4 via antenna(s) 109).

The source level signal 126 controls the gain of a pair of variable-gain amplifiers 132a and 132b. Each of the variable-gain amplifiers 132 receives the audio signal for a respective channel of the source output by the multiplexer 116. The output from the variable gain amplifier 132a is input into a mixer 136a, and the output from the variable gain amplifier 132b is input into a mixer 136b.

A vocal pickup 186 includes at least one microphone 182c dedicated to picking up spoken utterances from the wearer of the headset 100. The output signal $x_{vocal}$ 144 from the microphone 182c is input into a beamformer 148. The beamformer 148 also receives a signal $x_{ambient}$ 142 output by at least one of the microphones 182a and 182b included in the headphones. The beamformer 148 processes the received $x_{ambient}$ 142 and $x_{vocal}$ 144 signals to isolate the wearer's speech, as captured by the vocal pickup 186, outputting an isolated speech signal y 150. Although the beamformer 148 is illustrated receiving an audio signal from one headset microphone and one vocal pickup microphone, more than two microphones may be used with the beamformer 148, such as both headset microphones 182a and 182b, and two vocal pickup microphones.

The beamformer 148 filters out ambient noise by directionally isolating the spoken utterances from the wearer. The isolated speech signal y 150 from the beamformer 148 is input into a variable-gain amplifier 134. The gain of the variable-gain amplifier 134 is controlled by the voice level signal 128 from the controller 102. The output signal from the variable-gain amplifier 134 is input into the mixers 136a and 136b, mixing the gain-adjusted speech signal with the gain-adjusted source signals.

The output of the mixer 136a is input into a variable gain amplifier 172a, and the output of the mixer 136b is input into a variable gain amplifier 172b. The gain from the variable gain amplifiers 172 is controlled by an output level signal 162 set by the controller 102, which serves as a master volume for the headphone channels 180a and 180b.

An audio signal from the microphone 182a in the headphone channel 180a is input into the variable gain amplifier 170a. The output of the variable amplifier 170a is input into the mixer 174a. The output from the amplifier 172a is also input into a mixer 174a. The output of the mixer 174a is output to the speaker 184a of the headphone channel 180a. The ambient sound level signal 168 set by the controller 102 controls the gain of the amplifier 170a. Likewise, an audio signal from the microphone 182*b* in the headphone channel 180*b* is input into the variable gain amplifier 170*b*. The output of the variable amplifier 170*b* is input into the mixer 174*b*. The output from the amplifier 172*b* is also input into a mixer 174*b*. The output of the mixer 174*b* is output to the speaker 184*b* of the headphone channel 180*b*. The ambient sound level signal 168 set by the controller 102 controls the gain of the amplifier 170*b*. By adjusting the ambient sound level, the controller 102 controls how much they hear ambient sounds from the headphone speakers 184*a* and 184*b*.

The controller 102 includes a state machine that controls the source level via signal 126, the voice level via signal 128, and ambient level via signal 168 based in part on a current operational state or "mode" of the headset 100. The state machine sets and transitions between states based on input received from wearer via one or more user interfaces, the sources available, the protocol or profile associated with the source, and/or a prioritization hierarchy. The user interface built into the headset 100 includes a switch 103 that causes the state machine to temporarily enter "chat" mode, emphasizing ambient noise. Additional tactile user interfaces may be included in the headset 100. A user interface may also be provided on a connected device, such as a graphical user interface provided by an application running on a connected device such as a smart phone. Speech recognition may also be supported in the headset 100 itself, on the application running on the connected device, or via a cloud-based speech recognition service over a connected network, allowing a wearer to configure the headset 100 and change states using spoken commands.

Examples of source availability include the controller 102 receiving audio via a wireless protocol (e.g., Bluetooth) via antenna(s) 109, and/or a wired or wireless audio input/output (I/O) link 107 connecting to another device (as indicated by the connection detected signal 108). Examples of source protocols and profiles include wireless Bluetooth audio profiles such as Advanced Audio Distribution Profile (A2DP) used for multimedia audio streaming, and Hands-Free Profile (HFP) used for mobile telephony communications. In addition to the source audio signals received via the audio I/O link 107, the source audio signals from the controller may be generated from data stored on the headset 100 itself in storage 194, or audio received from another device.

When transitioning between operational states or "modes," the state machine causes the controller 102 to adjust the levels source, voice, and ambient levels. The state machine may also cause the controller 102 to execute other actions in connection with a state transition, such as pausing or restarting media content, generating visual, acoustic, and/or haptic indicators for the wearer, answering or hanging up on a telephone call, or causing other actions as applicable to the operational mode. The actions may control other processes executed on the controller 102, and/or send commands to connected devices (e.g., to an application on a connected smartphone or multimedia system, or to remote network-connected service such as an audio streaming service).

Figure 2:
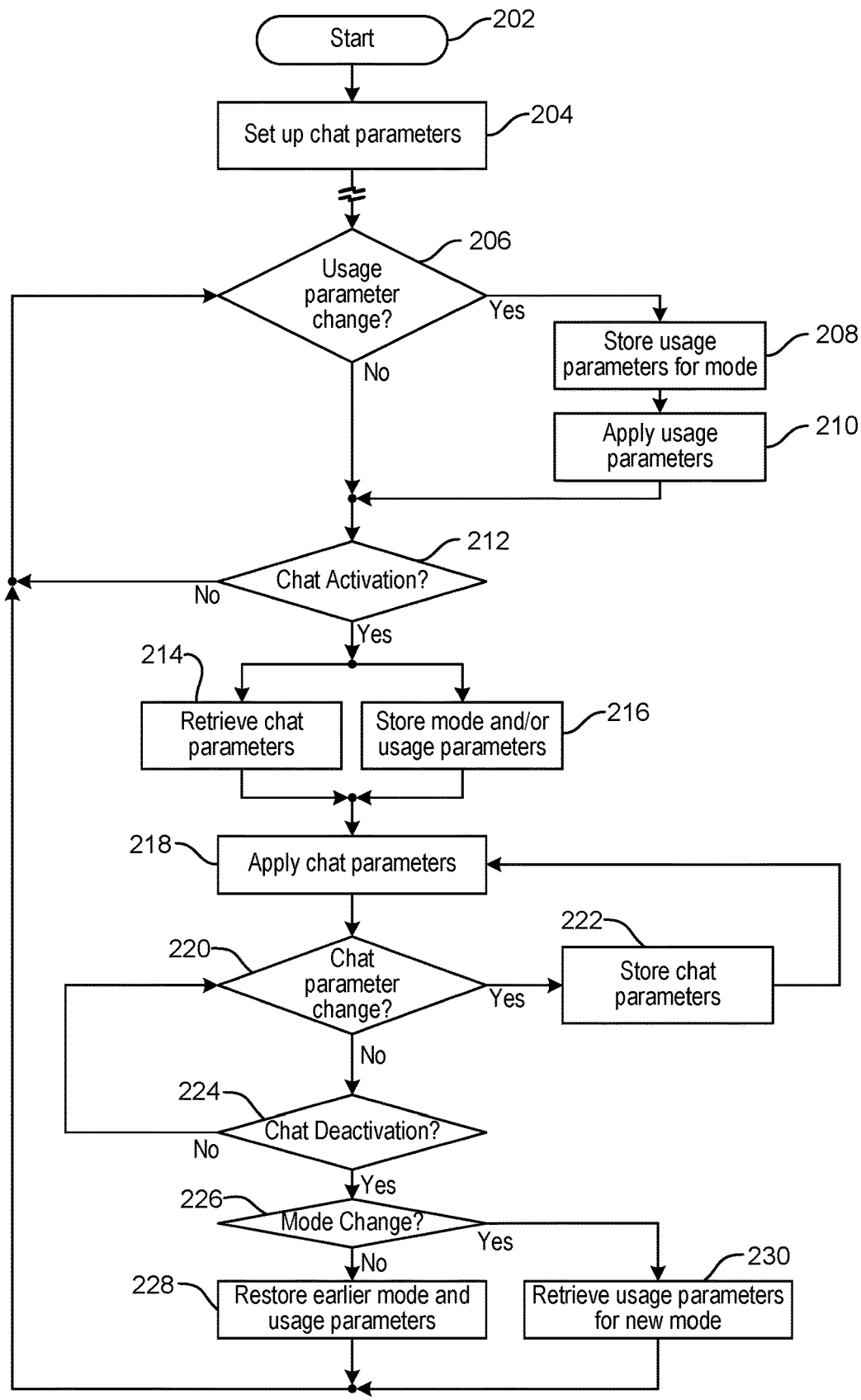
FIG. 2 illustrates a process flow executed by the improved headset.

FIG. 2 illustrates an example of operations by controller 102 associated with "chat" mode. At the start (202), the wearer first activates the headset 100. After the user first activates the headset 100, the wearer may be prompted to set up (204) the parameters for chat mode. This includes setting the source, voice, and ambient levels to be used during chat mode. The chat parameters are saved to non-volatile storage 194 on the headset 100, such as a flash memory or other solid-state memory. Individually configuring the "chat" mode parameters to individually set how audio source levels, ambient levels, and voice levels, increases circuit complexity, but improves utility and versatility. Examples of prompts include an audio or controller-generated speech prompt output via the speakers 184*a* and 184*b*, a visual prompt (e.g., output via a light emitting diode 1105 in FIG. 11), a haptics vibration prompt (e.g., output via vibrator 1104 in FIG. 11), and/or a visual prompt output via a display of a device 401 (FIG. 4) connected via a wired or wireless link.

The wearer/user may set the source, voice, and ambient levels using interfaces on the headset 100, or via an interface provided on a device connected to the headset 100 via a wired or wireless communication link. Examples of interfaces on the headset 100 will be discussed further in connection with FIG. 11, and include volume up (1103*c*) and volume down (1103*b*) button switches to set the source level 126, a voice (1103*f*) button switch to set the voice level 128, and an ambient (1103*g*) button switch to set the ambient level 168. An example of interfaces provided by the software application on the connected device 401 will be discussed further in connection with FIG. 4, and include a source volume slider (414*b*) to set the source level 126, a voice level slider (414*c*) to set the voice level 128, and an ambient volume slider (414*d*) to set the ambient level 168. After receiving the level settings from the interfaces on the headset 100 and/or from the application on the connected device 401, the controller 102 stores the chat mode parameters in storage 194, to be retrieved and applied if the wearer/user activates chat mode (e.g., by pressing chat button 103, by actuating a chat-button equivalent on the linked application on the device 401, by uttering a voice command to enter chat mode).

Thereafter, during normal operation, the wearer may adjust (206) the usage parameters for the current mode. In response to the controller 102 receiving a change to the source, voice, and/or ambient levels from a user interface (206 "Yes"), the controller 102 stores (208) the change to the usage parameters for the current mode in the non-volatile storage 194 and applies (210) the new parameters to the levels produced by circuitry 101. The user interfaces from which the controller 102 receives (206) the change include the button switches on the headset 100 (e.g., switches 1103*b*, 1103*c*, 1103*f* and 1103*g*) and/or the control interfaces (e.g., 414*b*, 414*c*, and 414*d*) displayed by the software on connected device 401. Changes to the output level 162 may be stored in either the non-volatile storage 194 or in memory 195, and may be applied across modes.

Independent of the current mode, chat mode may be activated (e.g., by actuating switch 103). If the controller 102 receives an indication to enter chat mode (212 "Yes"), the controller 102 retrieves (214) the stored chat parameters from storage 194, and stores the current mode and/or current usage parameters temporarily in memory 195. The controller 102 applies (218) the stored chat parameters, changing the source, voice, and ambient levels by setting levels 126, 128, and/or 168 to the preset chat settings. If active noise cancellation is in use, the controller 102 turns it off.

While in chat mode, the wearer may adjust the stored levels for chat mode. If the controller 102 receives (220 "Yes") an adjustment of one or more of the levels source, voice, and ambient levels while in chat mode, the controller 102 stores (222) the new chat parameters and applies (218) the new chat parameters to the circuitry 101 by adjusting levels 126, 128, and/or 168. The user interfaces from which the controller 102 receives (220) the change to the chat parameters include the button switches on the headset 100 (e.g., switches 1103*b*, 1103*c*, 1103*f* and 1103*g*) and/or the control interfaces (e.g., 414*b*, 414*c*, and 414*d*) displayed by the software on connected device 401.

Although user-configurable, a default setting would be to turn-off the source level, while mixing the voice and ambient levels. If the source-level setting may include a level where the source signal is cut off, at which the controller 102 may automatically pause playback of received media (e.g., sending a pause control signal to a connected Bluetooth device using the Bluetooth Audio/Video Remote Control Profile (AVRCP), or stopping or suspending playback if the audio originates with the controller 102 itself). In comparison, if the wearer increases the source level to be anything but "off," the controller may allow playback to continue at the reduced level.

The wearer may indicate to end chat mode by releasing the chat button 103, re-actuating the chat button 103, or via another user interface. After receiving (224 "Yes") an indication to end chat mode, the controller 102 determines whether the next operational mode has changed (226) based on input signaling received while in chat mode, such as if a telephone call or Bluetooth audio link disconnected while in chat mode, or a new call is received.

If there has not been a mode change (228 "No"), the controller 102 returns to the earlier mode, restoring (226) the usage parameters stored at step 216, returning the state machine and levels to the state that existed prior to the entry into chat mode. If media playback was paused, the controller 102 may also automatically cause playback to restart in response to leaving the "chat" mode state and returning to the earlier mode. If active noise cancellation had been in use, the controller 102 turns it back on.

In the alternative (226 "Yes"), if the mode has changed while in chat mode, the controller 102 retrieves (230) the usage parameters for the new/current mode from storage 194. Depending upon the new mode (e.g. a new media connection from another device via link 107 or Bluetooth), the controller 102 may also signal the new media connection to begin playback upon leaving the chat mode state. This ability to transition to a new state when a change occurred while in the chat state provides the headset 100 with context sensitivity, changing the source, voice, and ambient levels automatically due to changes in circumstance, without requiring additional input from the wearer. Further, if a change occurs while in chat mode to an audio playback state, the controller 102 may automatically signal to the originating device of the audio data to pause playback/streaming. (e.g., via a AVRCP message).

As another example of a state change, the controller 102 may receive the audio portion of a telephone call via a BlueTooth connection using the antenna(s) 109. BlueTooth supports a variety of profiles, with HFP being the standard protocol used for telephony. In response to receiving BlueTooth communications using the HFP, the state machine may transition from its current state to a notification state, adjusting the source, voice, and ambient levels via signals 126, 128, and 168, and generating visual, acoustic, and/or haptic indicators for the wearer. If the wearer indicates that the call should be answer, the state machine transitions to a call state, signaling the telephony device to accept the call and adjusting the source, voice, and ambient levels associated with the call mode. In comparison, if the wearer does not indicate that the call should be answered, the state machine resumes its earlier state, restoring the levels source, voice, and ambient to what they were before the call was received.

As other examples, the controller 102 may receive and reproduce streaming audio (e.g., via BlueTooth), the controller 102 may reproduce digitized audio (e.g., MP3) stored in storage 194 within the headset 100 itself, or be configured for karaoke (e.g., balancing and emphasizing source and voice levels while setting the ambient level to turn off ambient sound).

The state machine may be based around a prioritization hierarchy which dictates which state transitions are allowed, and which states take precedent. For example, the receiving a manual indication to enter chat mode state may take precedent over all other states. The telephony state may take precedent over media player states. Audio media being played over an established source may take precedence over a newly detected connection (e.g., connection detected signal 108 indicating a new connection). If a connection is lost, the state machine may transition to a next available connection (e.g., from source 1 to source 2 and vice versa).

In some or all states, voice recognition may be enabled to receive commands as a parallel operation, with recognized commands resulting in a change of state. In a standby mode in which no audio media, telephony, or other audio communications are in use, the state machine may enter a default "idle" state as the controller 102 waits to receive either audio data or a voice command. The wearer may set the ambient and voice levels to specify what mix (if any) of signals will be provided to the headphone speakers 184*a* and 184*b* in the idle state, in which the headset 100 may operate at lower power consumption.

Figure 3A:
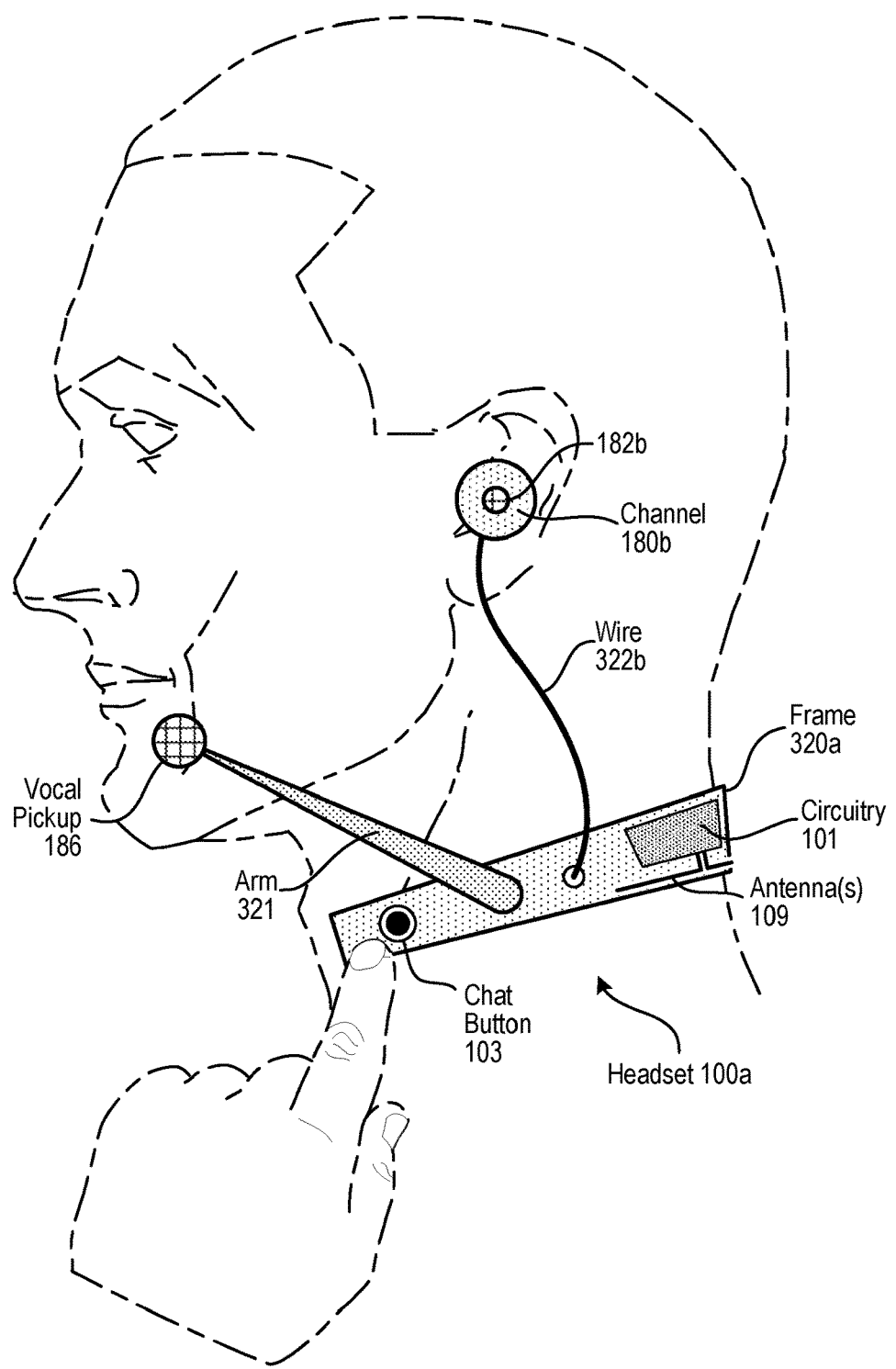
FIGS. 3A to 3C illustrate example structural arrangements of the improved headset.

FIG. 3A illustrates an example structural arrangements of the improved headset 100, labelled as headset 100*a*. This example is designed to be worn by a user (wearer) around the back of their neck. The headset 100*a* includes a U-shaped frame 320*a* that conforms to the user's neck, with the circuitry 101 and antenna(s) 109 embedded and/or attached to the frame 320*a*. As illustrated, the chat button 103 is located on the frame 320. The vocal pickup 186 is mounted on an arm or boom 321 that extends from the frame 320. The frame 320*a* is bendable, flexible and adjustable for various neck sizes. As illustrated, the headphone channels 180*a* and 180*b* connect to the circuitry 101 via wires 322*a* (not shown) and 322*b* extending from the frame 320*a*. When not in use, the wires 320*a* and 322*b* may be retracted back into the frame 320 for storage. The speakers 184*a* and 184*b* (not shown) face the user/wearer, while the microphones 182*a* and 182*b* are exposed to the outside of the headphones. The arm 321 may also be adjustable to allow the user to position the vocal pickup 186, and may fold back along the frame 320*a* for storage. A battery (not illustrated) is also included in the frame 320*a* to power the circuitry 101.

Figure 3B:
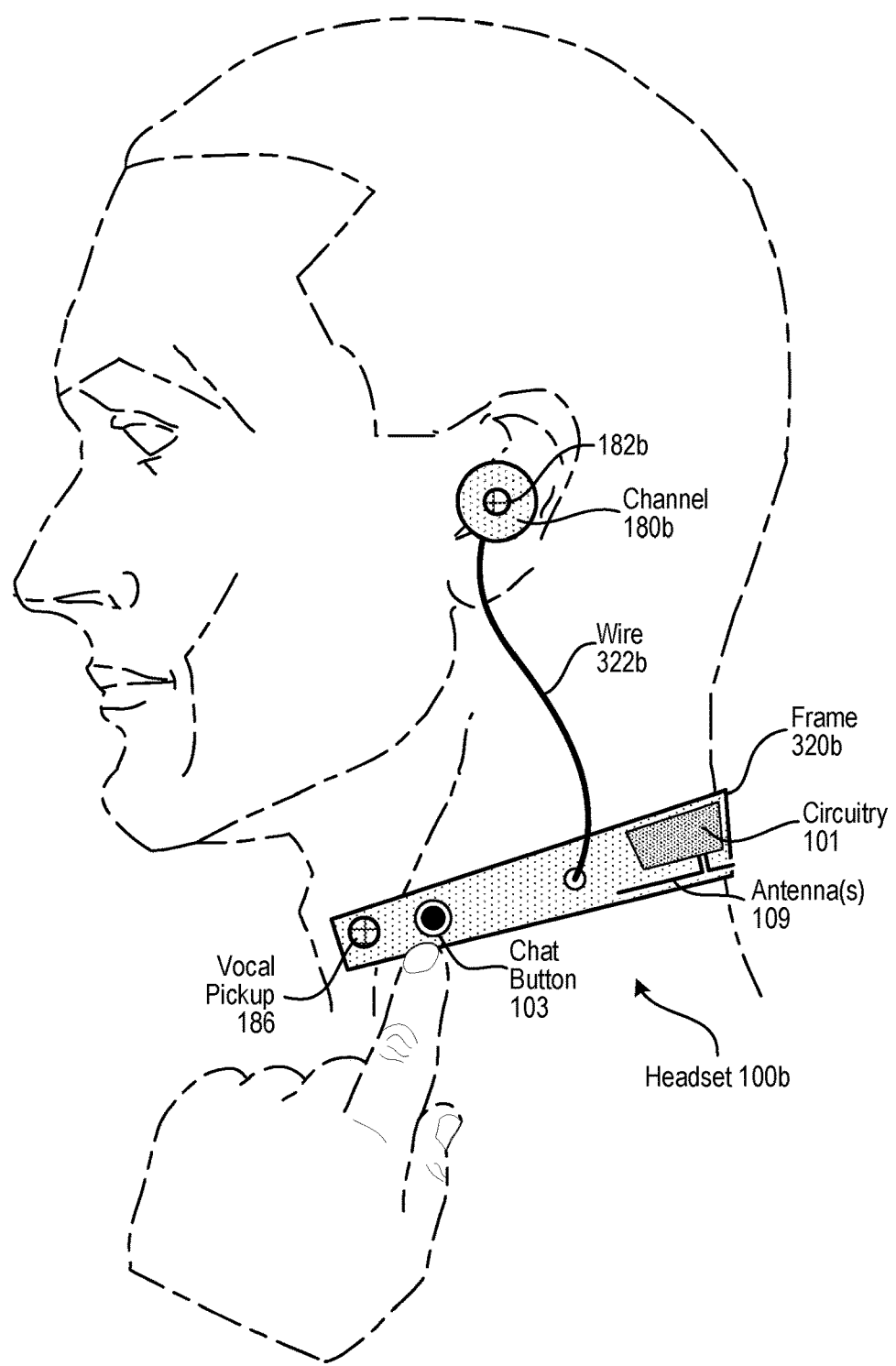

FIG. 3B illustrates an example structural arrangements of the improved headset 100, labelled as headset 100*b*. Headsets 100*a* and 100*b* are structurally identical except that the vocal pickup 186 is embedded in the frame 320*b* in FIG. 3B. If the vocal pickup 186 includes multiple microphones 182*c*, the microphones may be placed in parallel symmetry on opposite sides of the frame 320*b*. In addition, if the vocal pick up 186 includes multiple microphones 182*c*, the microphones 182*c* may also be placed on one side of the frame 320*b*. A battery (not illustrated) is also included in the frame 320*b* to power the circuitry 101.

Figure 3C:
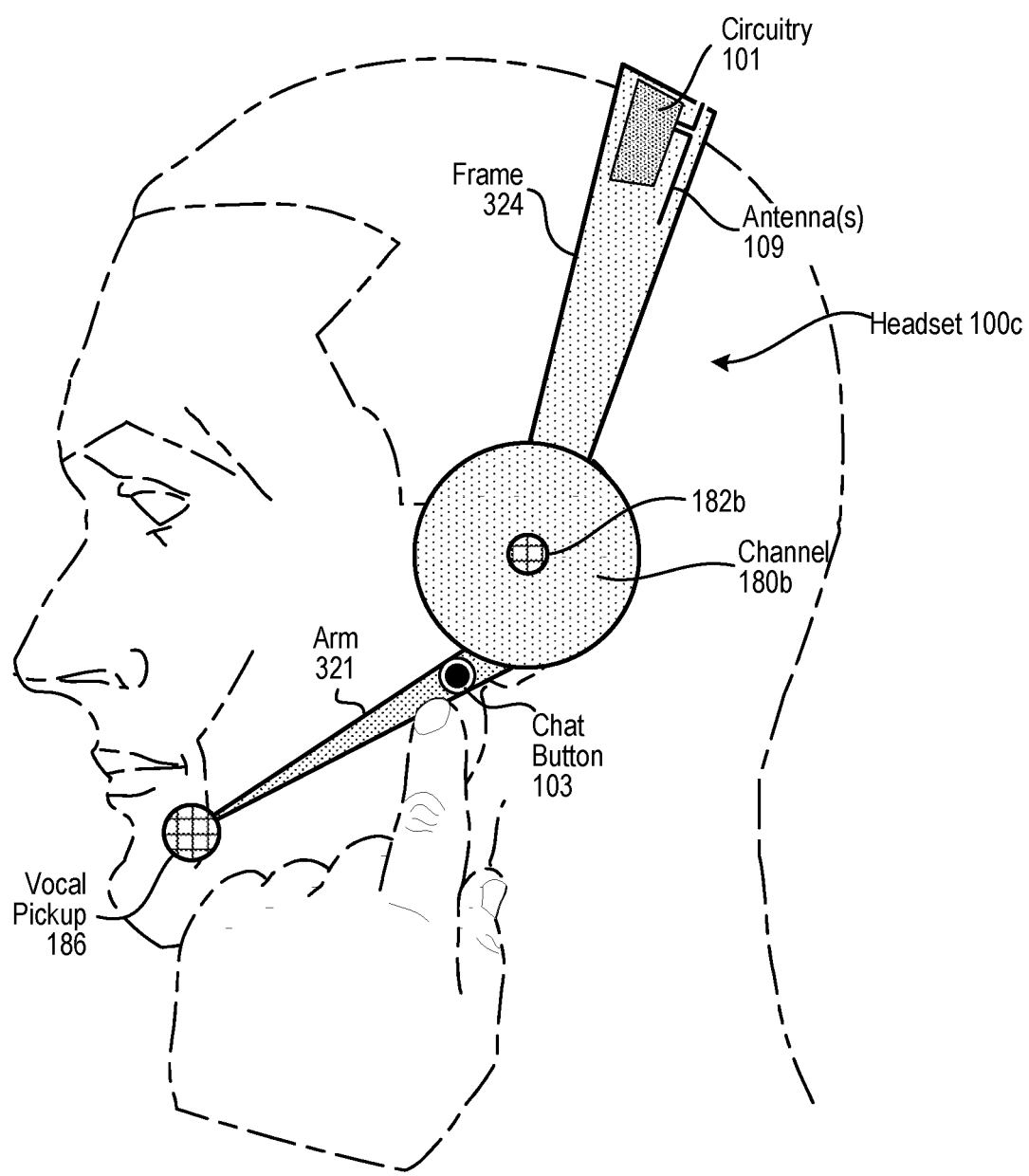

FIG. 3C illustrates an example structural arrangement of the improved headset 100, labelled as headset 100*c*. Whereas the headphone channels 180*a* and 180*b* in FIGS. 3A and 3B comprises earphones, in FIG. 3C the headphone channels cover the wearer's ear. This example is designed to be worn by a user (wearer) with the frame 324 over or behind their head. The circuitry 101 and antenna(s) 109 embedded and/or attached to the frame 324. The headphone channels 180a and 180b are attached to the frame 324 at opposite ends, and the arm 321 extends from frame 324. The arm 321 may be foldable alongside the frame 324 for storage. As illustrated, the chat button 103 is mounted on the arm 321, but may also be positioned on the exterior of the headphone channel 180a/180b or on the frame 324. A battery (not illustrated) is also included in the frame 320c to power the circuitry 101. While exemplary embodiments of the improved headset 100 have been illustrated to include a headphone channel 180a and 180b with an vocal pickup 186 connected to an arm 321, one skilled in the art should appreciate that the headset 100 may also include headphone channels 180a and 180b that include a vocal pickup 186 embedded in the headphone channels 180a and 180b.

Figure 4:
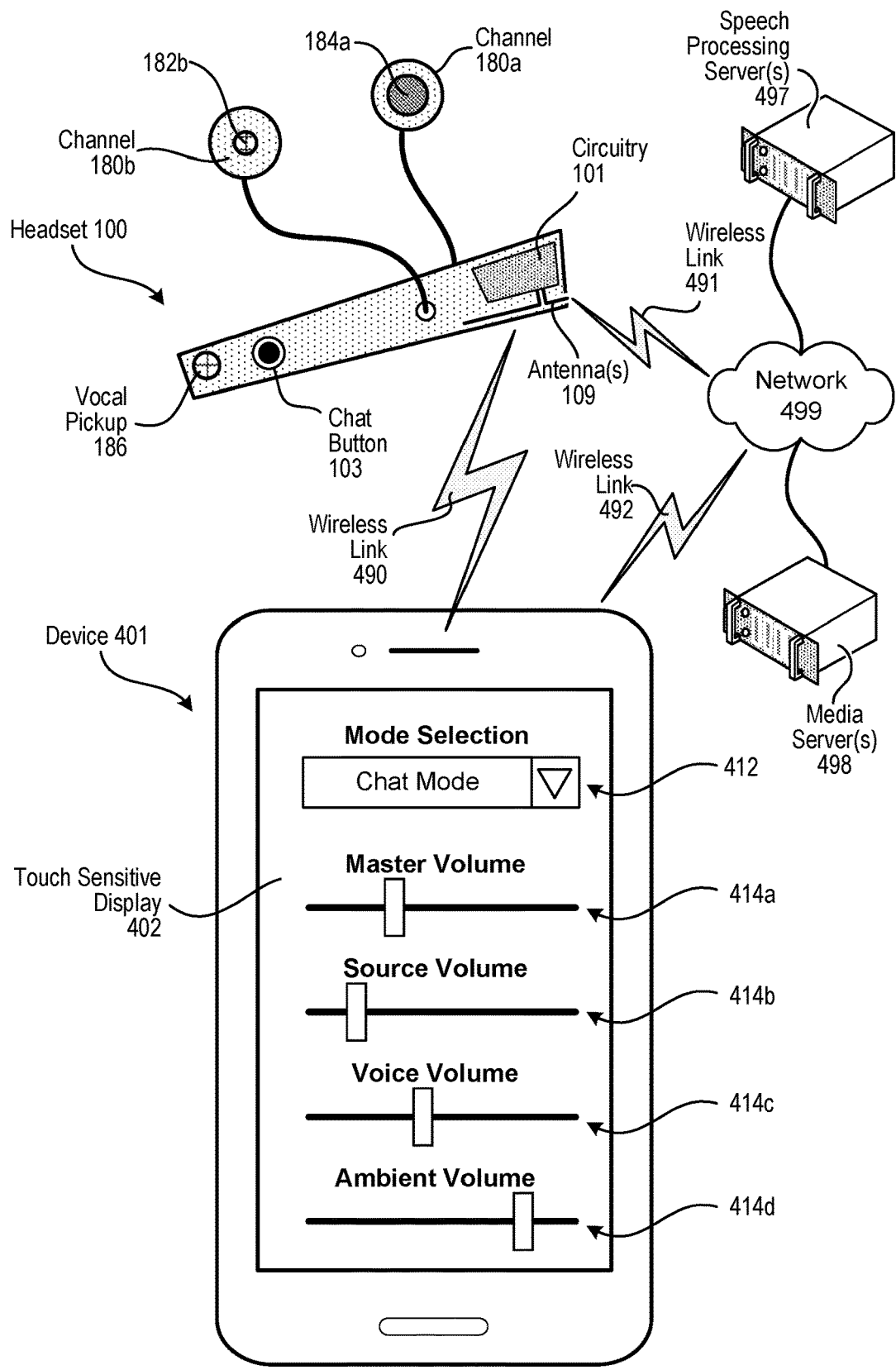
FIG. 4 illustrates a system including the improved headset.

FIG. 4 illustrates a system including the improved headset operating in conjunction with an electronic device 401 executing software that provides a user interface for controlling the headset 100. Although the headset in FIG. 4 resembles the structure of headset 100b in FIG. 2B, the choice of headset structure may be varied, and any of various headset structures may be used.

The headset 100 may connect to the device 401 via a wireless link 490, connecting a radio transceiver in the headset 100 with a radio transceiver in the device 401 (e.g., using Bluetooth). The device 401 is executing an application that provides a user interface for controlling the headset 100 via a touch sensitive display 402. The user interface may include an indication (412) of the current mode of the headset 100, and permit the user to select and set the settings for other modes.

As illustrated, the interface includes a slider 414a for setting the master volume. The setting of the slider 414a may be used to set the output level signal 162. Likewise, slider 414b may be used to set the source level signal 126, slider 414c may be used to set the voice level signal 128, and slider 414d may be used to set the ambient level 168. Although the user interface is provided by the software on the device 401, the settings are stored in storage 194 on the headset 100 itself. Other headset features and interfaces may be accessed and controlled via the touch sensitive display, as will be discussed further in connection with FIG. 11.

Instead of a wireless link 490, the headset 100 may connect to the device 401 via a wired link (e.g., audio I/O link 107, which may be wired or wireless). As an alternative, headset 100 may connect to the device 401 via a network 499 across links 491 and 492 (e.g., links via wireless local area network radio transceivers and/or cellular radio transceivers in the headset 100 and/or mobile device 401). The headset 100 may connect to one or more servers 497 via the network 499 for speech recognition services, and/or one or more servers 498 for streaming audio media. As an alternative, the headset 100 may transmit spoken utterances to the device 401, with the application on the device performing speech recognition, and/or communicating with a server 497 for speech recognition services. Recognized speech may be used to control the headset 100 (e.g., "Increase ambient level" resulting an increase in the gain provided by amplifiers 170a and 170b), or by the device 401 itself (e.g., "play next song").

Other features that the application on the device 401 may provide include a list of presets for each mode to allow a user to recall and adjust stored audio settings for the headset (e.g., a list accessible via pull-down 412), monitoring of the headset's state machine's current mode, a display of headset battery levels, and implementation of a voice interface to remotely control the controller 102. The application may also control LEDs and a haptic vibrator included in the headset 100 (illustrated in FIG. 11). Feedback to the user may also be provided by the device 401 itself, such as providing audio feedback in response to a voice command from the headset wearer.

FIGS. 5, 7, 8, and 9 illustrate examples of the beamformer 148 and associated components. When a feature is discussed as an attribute of or addition to the beamformer 148, such discussion refers to all four examples. Other features will be discussed in reference to a specific example or examples by identifying the specific beamformer(s).

Figure 5:
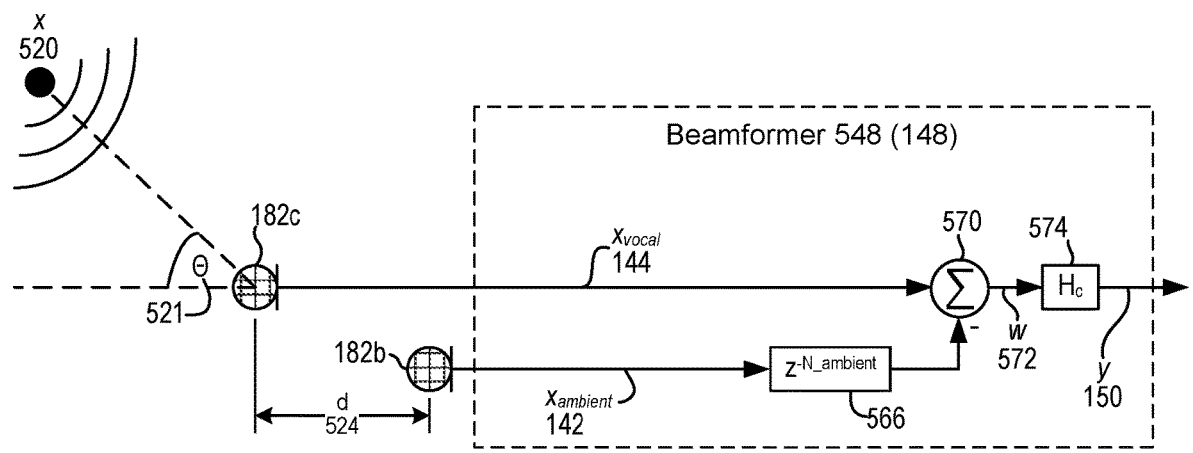
FIG. 5 illustrates a block diagram for a rear-null, delay-subtract beamformer circuit that may be used with the improved headset.

FIG. 5 illustrates a block diagram for a rear-null, delay-subtract beamformer circuit 548 that may be used as the beamformer 148 of the improved headset 100. The point "x" 520 represents the source of an utterance received by the microphone 182c of the vocal pickup 186. Ideally, this source will be the mouth of the headset wearer. The angle Θ (theta) 521 represents the position of the utterance source x 520 relative to the axis of the microphones 182c and 182b (the axis extending directly in front of the microphone 182c and extending roughly in-line with microphone 182b).

In relation to the components associated with the beamformer 148, "on-axis" is roughly in-line with microphones 182b and 182c and positioned on the same side of the headset 100 as the vocal pickup microphone 182c (i.e., the side of the headset 100 having the vocal pickup 186 on the arm/boom 321 or embedded in the frame 320b). The beamformer 148 is not a perfect beamformer since the wearer's face presents a surface, and the microphones 182b and 182c are not in open space. However the voice signal is essentially in line with these two microphones.

As discussed above, the beamformer 148 is designed to improve the pickup of speech from the wearer while reducing out-of-band and ambient noise. In FIG. 5, the beamformer 548 receives a signal $x_{vocal}$ 144 from microphone 182c, and a signal $x_{ambient}$ 142 from a headphone microphone 182b. The physical distance between the microphones is represented by the distance d 524. The time delay $T_d$ between the microphones is equal to d divided by the speed of sound. The time delay $T_d$ corresponds to the time difference of arrival of voice data between microphones.

The distance d 524 may be approximated based on the length of the boom/arm 321 or average distance from the microphone 182b positioned over the wearer's ear to the vocal pickup 186 located on the frame 320b itself. Making the boom/arm rigid improves the accuracy of the distance d 524, although a flexible arm may also be used. An adaptive filter (not illustrated) may be added to beamformer 148 to compensate for changes in the relative microphone positions, adaptively adjusting the value of d 524. The speed of sound may be approximated as the distance at one atmosphere in dry air at twenty degrees Celsius (sixty-eight degrees Fahrenheit), and may also be adaptively adjusted based on ambient conditions.

A finite impulse response (FIR) filter 566 receives the signal $x_{ambient}$ 142. A summer 570 subtracts the impulse response output of the FIR filter 566 from the signal $x_{vocal}$ 144. The order "N_ambient" of the FIR filter 566 is set to be approximately equal to the time delay $T_d$. The output of the summer 570 is a signal w 572 in which nulls are created in the on-axis response of the microphone 182c so as to emphasize the off-axis signal sounds originating at x 520. The filter $H_c$ 574 receives the signal w 572 and outputs a signal y 150. The filter $H_c$ 574 would typically be designed to generate a flat or shaped frequency response when $x_{vocal}$ 144 is on-axis (theta equals zero). However, a disadvantage of this filter 574 is that in beamformer 548, it results in peaks and drops for signals arriving off-axis (theta not-equal-to zero). These off-axis artifacts are undesirable and result in an un-natural overall signal response at y 150.

Figure 6:
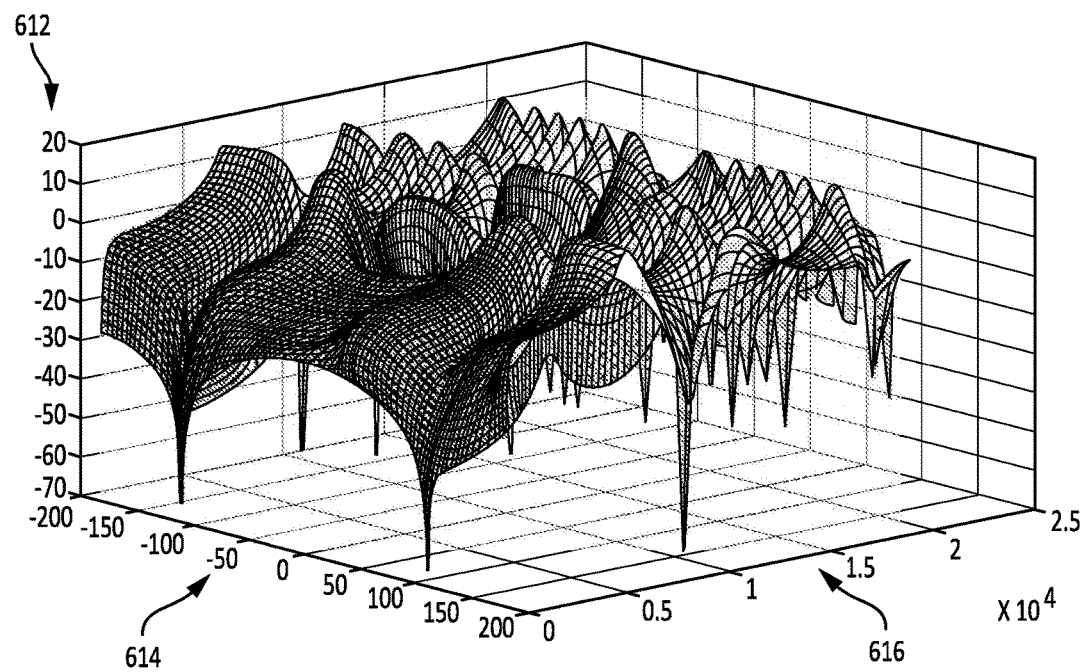
FIG. 6 is a three-axis plot illustrating the overall response of the beamformer from FIG. 5.

FIG. 6 is a three-axis plot illustrating the overall response of the beamformer 548 from FIG. 5. The vertical axis 612 represents the response of the output signal y 150 in decibels. The axis 614 corresponds to the angle Θ (theta) 521 in degrees. The axis 616 corresponds to the frequency in Hertz ($\times 10^4$). As demonstrated in this plot, the output response y 150 is far from a desired flat response. Based on these results, having designed the compensation filter Hc 574 to produce a flat on-axis response, the resulting off-axis response was found to be unacceptable. Too many signals that are off-axis are reduced at the nulls, but amplified at the peaks, producing a signal that could be disorienting in the presence of noise. Therefore, the beamformer 548 is only suitable as beamformer 148 if the source x 520 will be at zero degrees (i.e., on-axis) relative to the axis of microphone 182c, such as if the vocal microphone 182c is placed on an arm in front of the wearer, and aligned so that the axis between microphone 182b and 182c will intersect the wearer's mouth.

Figure 7:
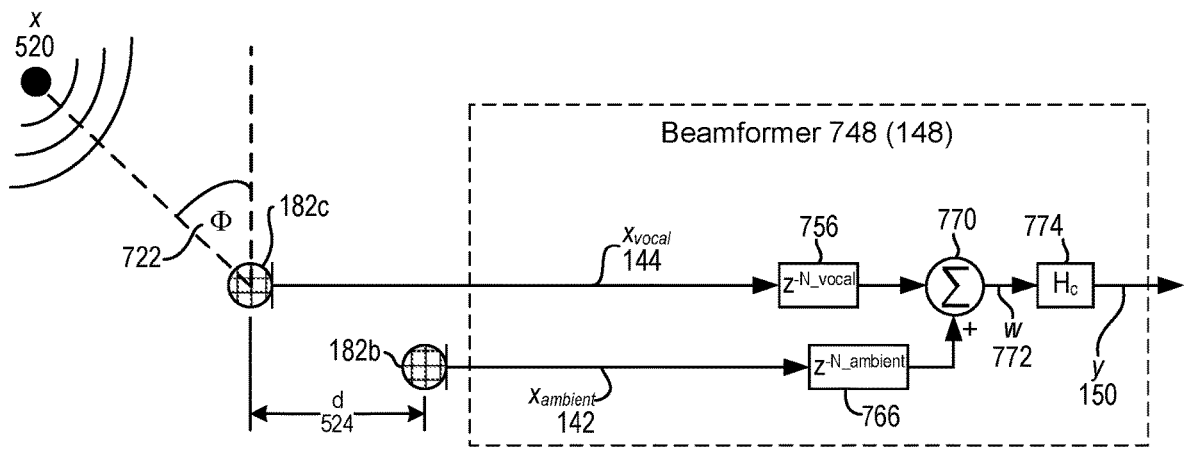
FIG. 7 illustrates a block diagram for a forward, broadside, delay-sum beamformer circuit that may be used with the improved headset.

FIG. 7 illustrates a block diagram for a forward, broadside, delay-sum beamformer circuit 748 that may be used as the beamformer 148 of the improved headset 100. With this beamformer, the angle φ (phi) 722 represents the position of the utterance source x 520 relative to a plane that is perpendicular to the axis of the microphones 182b and 182c.

The beamformer 748 receives a signal $x_{vocal}$ 144 from microphone 182c, and a signal $x_{ambient}$ 142 from a headphone microphone 182b. The physical distance between the microphones is represented by the distance d 524. The time delay $T_d$ between the microphones is equal to d divided by the speed of sound.

A FIR filter 756 receives the signal $x_{vocal}$ 144. A FIR filter 766 receives the signal $x_{ambient}$ 142. A summer 770 adds the impulse response outputs of the FIR filters 756 and 766. The order "N_vocal" of the FIR filter 756 and the order "N_ambient" of the FIR filter 766 are set to be approximately equal to the time delay $T_d$.

The output of the summer 770 is a signal w 772. The filter $H_c$ 774 receives the signal w 772 and outputs a signal y 150. The filter $H_c$ 774 would typically be designed to generate a flat frequency response when phi equals zero. When phi equal zero, the response of the beamformer 748 is naturally flat, but rejection of ambient noises requires multiple microphones that are closely spaced together in order to reject signals at other angles. Delays can be modified to steer response directionality, and higher sample rates yield better directional resolution. Overall, beamformer 748 is not effective for a two-microphone array.

Figure 8:
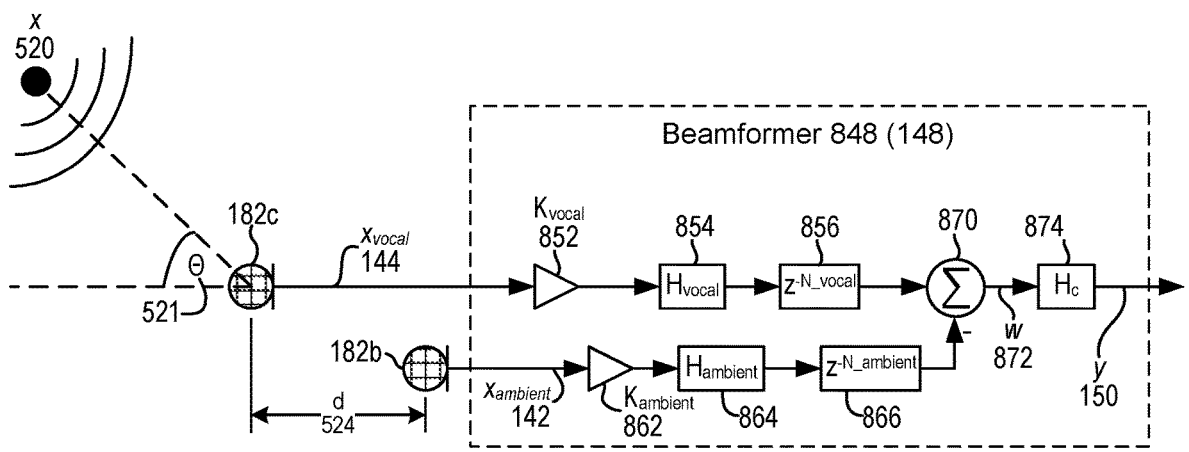
FIG. 8 illustrates a block diagram for an improved beamformer circuit that can support multiple beamforming configurations.

FIG. 8 illustrates a block diagram for an improved beamformer circuit 848 that can be used as beamformer 148 of the improved headset 100, and may support multiple beamforming configurations. The beamformer 848 does not suffer from the shortcomings of the beamformers 548 and 748, but the added complexity increases power consumption.

The angle Θ (theta) 521 again represents the position of the utterance source x 520 relative to the axis of the microphone 182c. The physical distance between the microphones is represented by the distance d 524. The time delay $T_d$ between the microphones is equal to d divided by the speed of sound.

The signal $x_{ambient}$ 142 from microphone 182b is input into an amplifier $K_{ambient}$ 862, and the signal $x_{vocal}$ 144 from the microphone 184b is input into an amplifier $K_{vocal}$ 852. The amplifiers 852 and 862 are used to correct mismatch between microphone sensitivities. The gain on amplifiers 852 and 862 may be set by calibration, or dynamically with a control algorithm.

The output of the amplifier $K_{vocal}$ 852 is input into a filter $H_{vocal}$ 854. The output of the amplifier $K_{ambient}$ 862 is input into a filter $H_{ambient}$ 864. The filters 854 and 864 are low-pass or band-pass filters used to selectively beamform over the frequencies of interest, which is the human vocal range from approximately 300 Hz to 3400 Hz. This helps eliminate many out-of-band and off axis artifacts in comparison to the beamformer designs in FIGS. 5 and 7.

The output of the filer $H_{vocal}$ 854 is input into a FIR filter 856. The output of the filter $H_{ambient}$ 864 is input into a FIR filter 866. A summer 870 subtracts the impulse response outputs of the FIR filters 856 and 866. The order FIR filter 856 is "N_vocal" and the order of the FIR filter 866 is "N_ambient." The group delay of the filters $H_{vocal}$ 854 and $H_{ambient}$ 864 reduces the nominal values N_vocal and N_ambient, with the combination of each respective group delay and FIR filter being set to be approximately equal to the time delay $T_d$. As an alternative, $K_{ambient}$ 864 or $H_{ambient}$ 864 can be configured to produce negative values, with summer 870 adding the signals instead of subtracting, to produce a same result.

The output of the summer 870 is a signal w 872 in which nulls are created in the on-axis response of the microphone 182c. The filter $H_c$ 874 receives the signal w 872 and outputs a signal y 150. The filter $H_c$ 874 would typically be designed to generate a flat or shaped frequency response when $x_{vocal}$ 144 is on-axis (theta equals zero).

Reducing the order N_ambient of the FIR filter 866 results in less rejection, but the first on-axis null occurs at a higher frequency. Therefore, there is a tradeoff between the level of off-axis rejection and the on-axis bandwidth of the signal at w 872 as N_ambient is adjusted. The design of beamformer 848 can be extended to multiple microphone (more than two) for improved performance. For example, the processed signal from the vocal microphone 182c can be subtracted by the summer 870 from an average of the processed signals from the microphones 182a and 182b.

Figure 9:
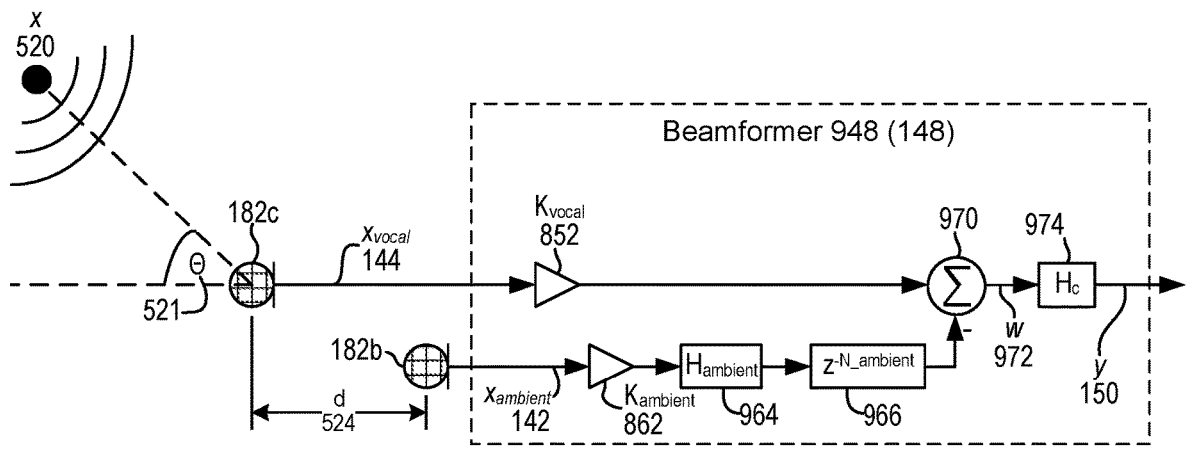
FIG. 9 illustrates a block diagram of an improved beamformer circuit that reduces the complexity of the circuit in FIG. 8.

FIG. 9 illustrates a block diagram of another improved beamformer circuit 948 that can be used as the beamformer 148. The beamformer 948 does not suffer from the shortcomings of the beamformers 548 and 748, and reduces the complexity of the circuit relative to beamformer 848 in FIG. 8.

The angle Θ (theta) 521 again represents the position of the utterance source x 520 relative to the axis of the microphone 182c. The physical distance between the microphones is represented by the distance d 524. The time delay $T_d$ between the microphones is equal to d divided by the speed of sound.

The signal $x_{ambient}$ 142 from microphone 182b is input into an amplifier $K_{ambient}$ 862, and the signal $x_{vocal}$ 144 from the microphone 184b is input into an amplifier $K_{vocal}$ 852. The amplifiers 852 and 862 are used to correct mismatch between microphone sensitivities. The gain on amplifiers 852 and 862 may be set by calibration, or dynamically with a control algorithm. For example, the gain of $K_{ambient}$ might be −1, whereas the gain of $K_{vocal}$ is the sensitivity difference of the two microphones to an on-axis signal (~0.7).

The output of the amplifier $K_{ambient}$ 862 is input into a filter $H_{ambient}$ 964. The filter 964 is a fourth order low-pass filter, configured to pass signals below 3400 Hz, although a lower cutoff frequency may be used (e.g., a frequency less-than-or equal to an the upper limit of the frequency range for human speech). This filtering signals from one microphone but not the other is not conventionally done with beamformers. As a consequence of filtering signals on the ambient noise signal path but not the vocal signal path, the beamformer 948 effectively has a single microphone (182c) at higher frequencies. The overall effect of this arrangement is a more natural voice signal y 150 as the beamformer output, with less artifacts and less noise.

The output of the filter $H_{ambient}$ 964 is input into a FIR filter 966. The order of the FIR filter 966 is "N_ambient." The group delay of the filter $H_{ambient}$ 864 reduces the nominal value of N_ambient, with the combination of the group delay from the filter $H_{ambient}$ 964 and the order of the FIR filter 966 being set to be approximately equal to the time delay $T_d$ (corresponding to the time difference of arrival of voice data between microphones). Reducing the delay length $z^{-N\_ambient}$ of the FIR filter 966 pushes nulls up in frequency while resulting in shallower nulls. The delay provided by the FIR filter 966 can be shortened until the first null is just out of the speech range at around 3 to 4 kHz. With this approach, an attenuation of 6 dB can be attained for signals/sounds originating behind the headphone wearer, with a relatively flat frequency response for the on-axis voice from 300 to 4000 Hz.

A summer 970 subtracts the impulse response output of the FIR filter 966 and the output signal from the amplifier $K_{vocal}$ 852. The output of the summer 970 is a signal w 972. The filter $H_c$ 974 receives the signal w 972 and outputs the signal y 150. The filter $H_c$ 974 is implemented as a boost at low frequencies to give an improved voice response, and a roll-off at higher frequencies. The result is that the output y 150 is relatively flat over the limited to voice frequency range, with non-voice content reduced. As an alternative, $K_{ambient}$ 964 or $H_{ambient}$ 964 can be configured to produce negative values, with summer 970 adding the signals instead of subtracting, to produce a same result.

The output signal y 150 from beamformer 948 produces a natural-sounding response for an on-axis voice with significant reduction of off-axis and out-of-band noise. Implemented by a digital signal processor (DSP), the beamformer 948 requires only a small amount of signal processing. The beamformer 948 can be implemented with a small number of signal processing components, such as eight (8) digital biquad filters (a type of second-order recursive linear filter containing two poles and two zeros), a summer, and a short delay line.

A speech detection algorithm can be used to trigger adaptive processing to maximize the signal level at w 972. This results in improved off-axis rejection while effectively steering the beam to the voice dynamically.

The design of beamformer 948 can be extended to multiple microphone (more than two) for improved performance. For example, the processed signal from the vocal microphone 182c can be subtracted by the summer 970 from an average of the processed signals from the microphones 182a and 182b. With the use of three or four microphones, performance may be further improved. With the use of additional microphones and filters, the field of off-axis rejection can be widened.

Figure 10:
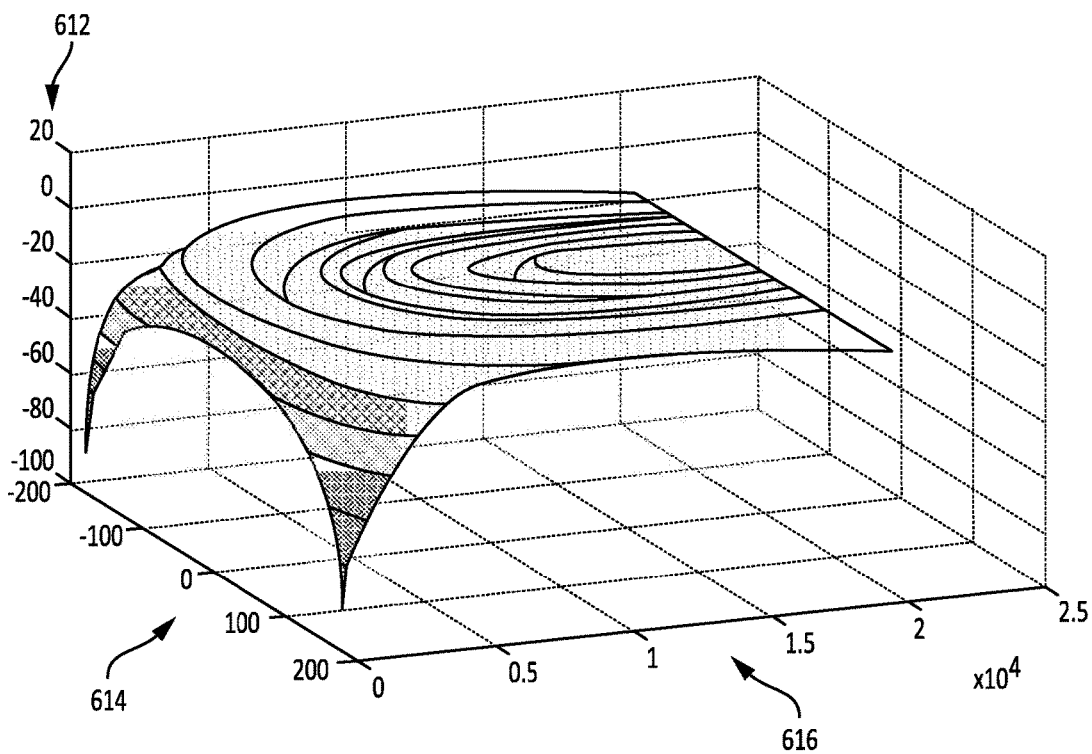
FIG. 10 is a three-axis plot illustrating the overall response of the beamformer from FIG. 9.

FIG. 10 is a three-axis plot illustrating an example of the overall response of the beamformer 948 from FIG. 9. While the plot in FIG. 10 shows some of the advantage of the beamformer 948 in FIG. 9, the filter $H_c$ 974 used to generate the plot was not a fully tuned version. With further tuning of the filter $H_c$ 974, and even flatter response may be achieved.

Any of the various beamformers 548, 748, 848, and 948 described herein may be implemented as the beamformer 148 in the headset 100, as a function of the intended application for which the headset 100 will be used.

Figure 11:
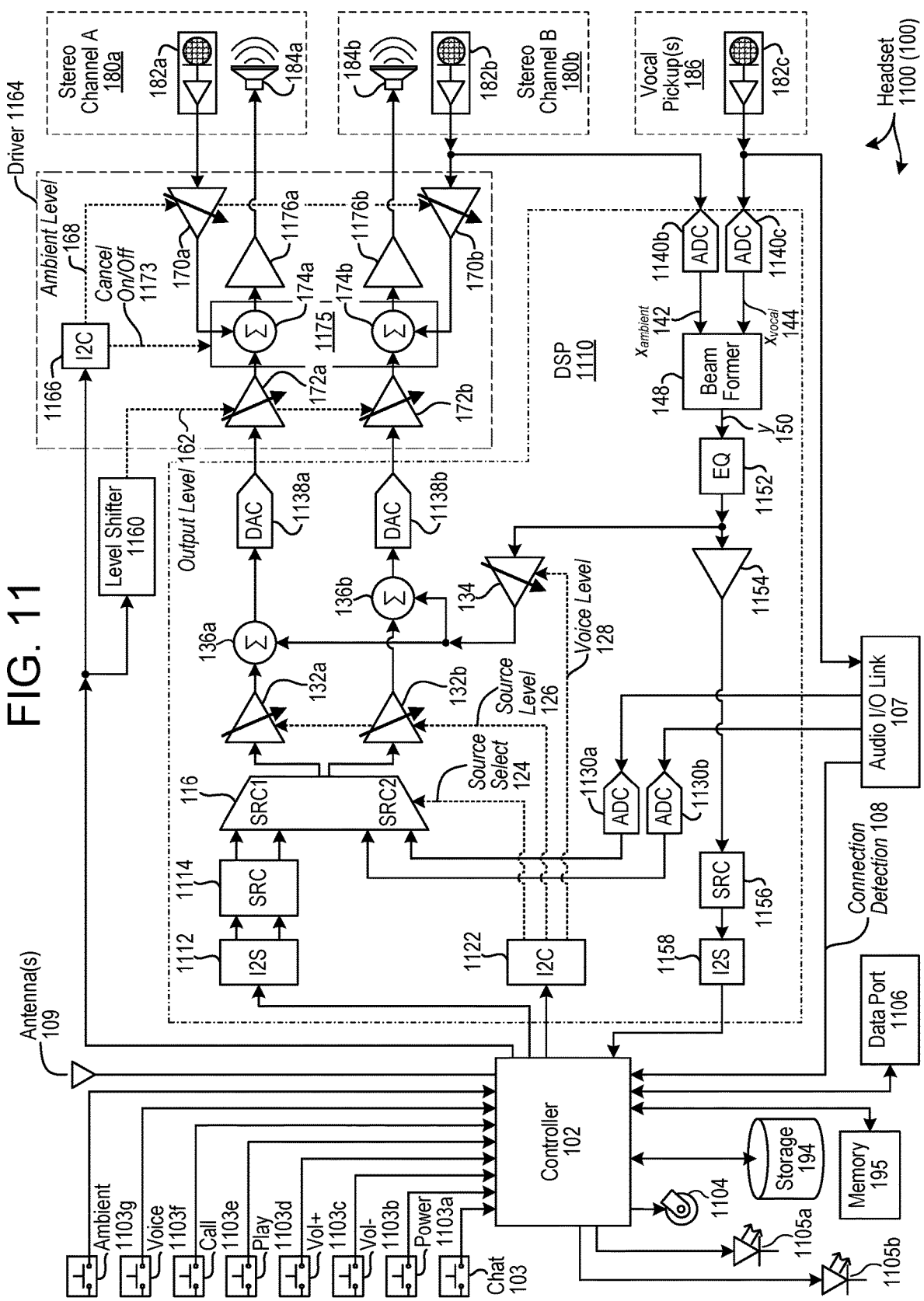
FIG. 11 illustrates is a high-level schematic overview as a further example of the design in FIG. 1.

FIG. 11 illustrates is a schematic overview as a further example of the design of headset 100 in FIG. 1. In FIG. 11, the example of circuitry 101 comprises the controller 102, storage 194, memory 195, a digital signal processor (DSP) 1110, a level shifter 1160, and a headphone driver 1164. The headphone driver 1164 may provide active noise cancellation. As an example of a specific embodiment, the DSP 1110 may comprise an ADAU1772 Low Power Codec with Audio Processor from Analog Devices, the level shifter 1160 may comprise a PCA9540 2-channel I²C multiplexer from NXP Semiconductors, and the driver 1164 may comprise an AS3410 ambient noise-cancelling speaker driver from AustriaMicroSystems AG. An example of the controller 102 is a BlueCore5™ Multimedia Bluetooth chip from Qualcomm, which includes a DSP, a stereo codec, and onboard flash memory. All of the functionality discussed with the headset 100 is included in the headset 1100, with the headset 1100 providing additional interfaces and circuit detail.

I²C is a serial communication bus. I²C signaling is used in headset 1100 to communicate control signals from the controller 102 to the other components. The controller 102 communicates with an I²C interface 1122 in DSP 1110. Based on messages from the controller 102, the I²C interface 1122 outputs the source select signal 124, the source level signal 126, and the voice level signal 128. The source select signal 124 is one-bit if the multiplexer 116 has two inputs, two-bits if the multiplexer 116 as three or four inputs, and so-on. The source level signal 126 may be, for example, seven bits to produce one-hundred-twenty-eight (128) steps, each step producing a change of one (1) decibel, for a source level range of zero (minimum source volume) to one-hundred-twenty-seven (maximum source volume). The voice level signal 128 may be, for example, seven bits to produce one-hundred-twenty-eight (128) steps, each step producing a change of one (1) decibel, for a voice level range of zero (minimum voice volume) to one-hundred-twenty-seven (maximum voice volume). Another signal that may be output by the I²C interface 1122 is a one-bit voice state signal (not illustrated) used to mute and unmute the vocal pickup microphone(s) 186. The signals and levels may be set, among other ways, by the I²C interface 1122 writing values to specific registers of the DSP 1110.

The driver 1164 also includes an I²C interface 1166. Based on messages from the controller 102, the I²C interface 1166 set the ambient level 168. The ambient level signal 168 may be, for example, seven bits to produce one-hundred-twenty-eight (128) steps, each step producing a change of 0.375 decibels, for an ambient level range of zero (minimum voice volume) to one-hundred-twenty-seven (maximum voice volume), for an ambient level range from −6 dB to +41.625 dB. Based on messages from the controller 102, the I²C interface 1166 may also control a noise cancellation on/off signal 1173. The noise cancellation signal 1173 controls a noise cancellation circuit 1175 that includes the mixers 174a and 174b. The signal and level may be set, among other ways, by the I²C interface 1166 writing values to specific registers of the Driver 1164. The level shifter 1160 also includes an I²C interface (not illustrated). The level shifter 1160 controls the output level 162 in accordance with messages from the controller 102.

The headset 1100 may also include one-or-more additional user interfaces so that the wearer can directly control the headset 1100, such as buttons switches 1103a to 1103g. The power button 1103a may be used to wake the headset 1100 up from a standby state using a long-duration press, to turn off headset power using a longer-duration press, and to turn power on if already in an off-state. A visual, acoustic, and/or haptic prompt may be output in conjunction with a power event. Bluetooth pairing setup of the headset 1100 with another device (e.g., 401) may be performed by making the headset 1100 discoverable and connectable following power-up, and/or by a long press of the power button 1103a while the state machine of the controller 102 is in a standby mode.

On a connection timeout, the state machine of the controller 102 may cause the headset 1100 to enter the standby mode in which the ambient and voice levels are active, the multiplexer 116 is set to select the audio I/O link 107, and the Bluetooth radio is switched off. A connection timeout occurs when the controller 102 has detected no connection for a time period exceeding a set duration (e.g., 2 minutes), and the mode of the state machine does not correspond to a headset-based media or activity mode. The controller 102 may determine there is no connection, for example, based on their being no active Bluetooth connection, and no indication that there is a connected device based on signal 108. A long press of the power button 1103 wakes the headset 1100 from this reduced-power standby state.

The volume down button 1103b and volume up button 1103c may be used lower and raise the source volume, controlling the source level 126. Short presses may result in a step decrease, whereas long presses may ramp the source volume down or up. The play/pause button 1103d may be used to trigger media playback play and pause. If the selected source is an external device that accepts control commands (e.g., a Bluetooth-connected device or a media player included in the headset 1100), then a pause command may be sent to the connected device or media player to pause playback. If the selected source is an external device that does not accept control commands (e.g., if the audio I/O link comprises an analog headset jack connection), then a pause may cause the controller 102 to mute the source signal. Long presses of the play/pause button 1103d may also be used to skip to the next track, when the source device accepts control commands.

A short press of the call button 1103e may answer an HFP call, or place the call on hold, whereas a long press will end the call. If there is no HFP call, the call button 1103e may be used to initiate voice recognition. A short press of the voice button 1103f may mute or unmute voice feedback from the vocal pickups 186, whereas a long press may cause the controller 102 to rotate through preset values of the voice level signal 128. A short press of the ambient button 1103g may mute or unmute the ambient level, whereas a long press may cause the controller 102 to rotate through preset values of the ambient level signal 168.

The headset 1100 may provide a wearer with various forms of feedback. For example, light-emitting-diodes 1105a and 1105b may be used to provide visual feedback, and a vibrator 1104 may be used to provide haptics feedback. The controller 102 can also provide audio feedback by selecting the Source 1 input of the multiplexer 116 and outputting signals to generate sounds from the headphone speakers 184a and 184b. A data port 1106, such as a Universal Serial Bus (USB) port may be provided, for interfacing the headset 1100 with a computer, uploading media to the storage 194, updating the controller's firmware, etc.

I²S is a serial bus interface standard for connecting audio devices together. I²S signaling is used to communicate audio signals to-and-from the controller 102. The controller 102 outputs Source 1 audio to an I²S interface 1112 of the DSP 1110. The stereo output of the I²S interface 1112 is input into a sample rate converter (SRC) 1114 that converts digital audio sample rates between rates used within the DSP 1110 and rates used by the I²S bus connection. The output of the SRC 1114 provides the Source 1 input to the multiplexer 116. In the opposite direction, the isolated voice signal from the voice pickup(s) 186, after processing, are input into an SRC 1156. The output of the SRC 1156 is input into an I²S interface 1158. The output of the I²S interface is input into the controller 102.

Analog-to-digital converters (ADCs) and digital-to-analog converters (DACs) may be included as needed. For example, ADCs 1130a and 1103b may receive an analog audio signals from the audio I/O link 107, and output the converted digital signals to the Source 2 input of the multiplexer 116. As another example, ADCs 1140b and 1140c may convert analog signals from the microphones 180b and 180c for processing in the digital domain by the beamformer 148 on the DSP 1110. DACs 1138a and 1138b may be used to convert digital signals from the mixers 136a and 136b of the DSP 1110 into analog signals to be input into the variable-gain amplifiers 172a and 172b of the driver 1164.

An equalizer filter 1152 may be included to further process the isolated speech signal y 150 from the beamformer 148. Equalizer filter 1152 serves as a final-shaping filter to enhance the overall frequency response of the voice signal. For example, the beamformer 148 can be tuned to provide a flat response over the voice band (e.g., 300 Hz to 3400 Hz), with the equalizer filter 1152 tuned to configure the overall voice audio response to sound pleasant to the human ear. As an alternative, the filter $H_c$ 574/774/874/974 and equalizer filter 1152 could be combined into a single more complex filter.

At various stages, amplifiers may be included to adjust signal gain. For example, amplifiers 1176a and 1176b may provide a final stage of amplification of the signals from the summer/mixers 174a and 174b before the signals are output by the headphone speakers 184a and 184b. Another amplifier 1154 maybe included between the equalizer 1152 and the SRC 1156 to limit the gain of the microphone audio to the range used by the SRC 1156.

While control of other devices (e.g. device 401) by the headset 100, and control of the headset 100 by other devices was discuss with Bluetooth Audio/Video Remote Control Profile (AVRCP), AVRCP is only an example. Other examples include Bluetooth Serial Port Profile (SPP) and Apple's iPod Accessory Protocol (e.g., iAP and iAP2) communication profiles.

In addition to or in combination with the controller 102, storage 194, and memory 195, the components of the circuitry 101 may include or be performed by one or more digital signal processors (DSPs), such as implemented with DSP 1110 in FIG. 11. In combination with digital processing or as an alternative, analog circuitry may also be used.

The headsets 100 and 1100 may include additional hardware or interfaces, such as hardware (e.g., potentiometers, variable capacitors) or an interface to adjust/calibrate microphone levels. The controller 102 may also be configured to support messaging protocols (e.g., text messages) to support the control and monitoring of messaging by an external application (e.g., on device 401). The controller 102 may also be configured to provide customized voice prompts, which may be input into the output audio via the mixers 136.

The headsets 100 and 1100 implement a quick access preset allowing the user/wearer to change the operating parameters of the audio and user interface systems. An example of this feature is its application for a "chat mode." An example use case would be when a user makes a telephone call through the headset 100/1100. System parameters have been set for use during the telephone call context such that: (a) telephone call volume is turned up by setting the source level 126, (b) ambient input volume has been muted or set to its lowest level by setting the ambient level 168, (c) active noise cancellation is made active (e.g., by setting signal 1173), and (d) voice feedback is turned up by setting the voice level 128 so that the user can hear themselves, with the beamformer 148 selectively attenuating any ambient noises received via the vocal pickup(s) 186.

The user could be in a situation where they need to communicate with someone in their immediate surroundings. Normally in this situation they would have to remove the headset, losing contact with the call, or possibly hanging up the call. They may have to adjust several parameters which may not be readily accessible on their phone.

The quick access presets for chat mode solves this problem by allowing the user to load a temporary configuration through the press of a single button—chat button 103. When the chat button 103 is activated, the existing operating conditions are saved (216 in FIG. 2), and a new configuration is loaded (214 and 218 in FIG. 2). For the "chat mode" configuration this allows the user to carry on a conversation in his/her immediate surroundings without removing the headset, and without the person in the telephone call hearing the local discussion. When the button is pressed, the controller 102 makes the following changes are made to the system: (a) the telephone call volume is turned down, allowing user to monitor the call by adjusting the source level 126, (b) ambient input volume is turned up allowing the user to hear the conversation by adjusting the ambient level 168, (c) active noise cancellation is turned off (e.g., by toggling cancel signal 1173), (d) voice feedback is kept on (or turned on if it was off), (e) the processed microphone signal y 150 to the controller 102 for the telephone call is muted (but continues to be input into variable gain amplifier 134), and an audible prompt is played to identify the changed state/configuration.

Once the local conversation is ended, a single press of button 103 retrieves the previous configuration and returns the system to its original operating state (228 in FIG. 2). This allows the user to seamlessly return to his original telephone call.

The general intent of the "chat" feature is to provide a means for the user to change operating configuration quickly and easily without having to take out a phone and manipulate menus, and without removing the headset. The feature could be extended to allow for adjustment of additional parameters during the context change including: a pulse of haptic actuator such as a vibration motor 1104, a change/pulse of display elements such as LEDs 1105 or other indicators, messaging to the telephone application to display context based information, control of media playback, playback of audible prompts and/or messages, and/or control of other audio functions such as active noise cancellation or audio effects.

As an alternative to overwriting the existing levels 126, 128, and 168 when switching between modes, differential offsets to current operating parameters could instead be applied.

As used herein, when an audio signal level is "reduced" or "decreased" or "lowered," that is intended to mean that the signal, whether in analog or a digital representation, is set to have a reduced amplitude, but that the signal still continues to include audio information. In comparison, when the audio signal or signal source is "muted" or turned "off," the signal carries no audio information.

Although the source audio is described as multimedia audio and telephony, other sources may be used such as aviation communications systems and other radio and electronic audio communications systems.

Examples of the software application executed by device 401 include iOS and Android operating system applications. The developmental foundation of the iOS application may be, among other things, Xcode, the iOS software development kit (SDK), and/or objective-C. The developmental foundation of the Android application may be, among other things, Android Studio, Android SDK, and/or Java. Examples of communications interfaces used for wireless link 490 between the headset 100/1100 and display 401 include, among other things, Bluetooth 2.1 or Bluetooth Classic which supports HFP, A2DP, and AVRCP, SPP, and iAP profiles.

The application may implement general functionality features, one-or-more user interfaces, headset identification, data management features, phone call operations, quick-preset chat operation, background/foreground operation, a communications application programming interface (API), an AVRCP profile, and support for events, inputs, and button presses.

Application general functionality includes providing control of volume levels in the headset 100/1100 through a graphical user interface (GUI) using touch sensitive display 402. As described in connection with FIG. 4, at least three levels may be set. The ambient volume controls the level of sound from the environment surrounding the headset 100/1100 to be output to speakers 184a/184b, and may be set from within the application using control interface 414d. The voice volume controls the level of the user/wearer's own voice to be output to speakers 184a/184b, and may be set from within the application using control interface 414c. The source volume controls the level of sound from a selected active media or communication source to be output to speakers 184a/184b, and may be set from within the application using control interface 414b. Examples of modes that may be selected via an interface 412 provided by the application include a telephone call mode, a multimedia audio mode, and the chat mode.

As will be discussed further below, the application may also provide extended functionality beyond the capabilities of the headset 100/1100 itself. Such features may be provided through a background service or thread which provides device-triggered functionality on the device 401, such as support for Amazon's Alexa and Music streaming service. The application may be designed such that these extended services run independently of the user interface (as displayed on display 402), and may be shutdown or disabled by the user.

The user interface assets may be delivered to a display driver of the device 401, among other ways, as pixel bitmaps, as vector objects, and/or as graphic packages comprising interface objects scaled for multiple resolutions. The applications may provide some animations, such as a Bluetooth connecting animation when the device 401 connects to the headset 100 via wireless link 490.

On first run, and until a headset 100/1100 has been connected, the software application may output a quick-start animation or other message. After the animation is complete, the software on the device 401 will attempt to communicate with a headset 100/1100 that has been paired with the device 400. If no headset 100/1100 is connected, the application may display a "waiting" popup message. If or after a headset 100/1100 is connected, the software may switch the display to an audio mix interface, such as that shown on display 402 in FIG. 4.

The software interface may include display of a battery icon (not shown), providing a representation of the charge of the headset's battery (included in or on frame 320). If the software determines that the touch sensitive display 402 has received a touch of the battery icon, the software application may query the controller 102 of the headset 100/1100 for the headset's current battery state. The application may then display a popup window with the battery information and some power saving tips. Touching the display 402 will remove the popup and return to the mix interface. Battery values from the headset 100/1100 may represent voltage levels mapped to a percentage via a table lookup. In the alternative, the application may disable the battery lookup, and/or display the raw API values from the controller 102 for the battery level.

The display may include a variety of other icons. A settings icon may bring up a settings interface. A sorting icon may be used to allow the user to reorganize the preset list. For example, pressing the sorting icon may bring up a list/sort page with two buttons. This page allows the user to reorganize the preset list. Each preset shows a 3-line icon indicating that the presets can be dragged. Dragging a preset allows it to be moved within the list. The "phone calls" and "quick chat" presets are not draggable, and always stay at the top of the list. Pressing "SAVE" saves the revised list, pressing "CANCEL" or the back arrow reverts to the previous list. After pressing either CANCEL or SAVE the display returns to the normal Presets screen.

After a press of a New Icon, the application will switch to the "adjust mix" screen. The name field for the mix may be set to "new mix" in grey. The application may query the headset 100/1100 in order to preserve the current parameters before editing.

In general this behaves the same as the "adjust mix" screen. If saving without setting the name, a keyboard popup may be presented to enter a name. If saving over an existing preset, the app should query with the following text: "Preset already exists. Do you wish to replace [Target Mix]?" with options to "Save" or "Cancel". Upon reaching a limit of 50 mix presets, the application will post the message: "You have used all available presets. Please remove a preset before saving a new one." with an "OK" button.

There may be a single dedicated preset for telephone calls. There may be a single dedicated preset for the quick access chat mode. There are multiple presets for music which may be named by the headset users. Several initial default presets may be provided for a user. Examples of default presets appear in Table 1 below:

TABLE 1

| Title | Source | Ambient | Voice |
| --- | --- | --- | --- |
| "Phone Calls" | 10/On | 10/Off | 10/On |
| "Quick Chat" | 2/On | 10/On | 6/On |
| "Aware" | 8/On | 10/On | 10/Off |
| "Karaoke" | 10/On | 8/Off | 11/On |
| "Music" | 11/On | 8/Off | 10/Off |

The phone calls preset may only be selected and edited when there is an active telephone call. The quick chat (i.e., chat mode) preset may be selected at any time. Once in quick chat mode all edits will affect only this preset. When not in a telephone call, the phone calls preset is inactive, and the others are all active/selectable (e.g., via the mode selection pull-down 412). When in a telephone call, only the phone calls preset and quick chat preset are active/selectable. Inactive presets may be greyed out (based upon in-call or not) and cannot be selected.

There is only one selected preset at a given time. A selected preset is highlighted and/or indicated by the mode selection interface 412. The selected preset will be an exact match to the current mode settings in the headset 100/1100. This means all levels and mute/unmute states of the headset 100/1100 as displayed by the device 401 match to those stored in the presets in storage 194. The software on device 401 may poll the controller 102 periodically to maintain current settings.

Selecting any of the active presets on the presets screen will send the stored preset values associated with that preset to the headset 100/1100. Thereafter, the application will bring up an "adjust mix" page populated with the selected preset. This display may be dynamic, meaning that as changes are made using buttons (103 and 1103a to 1103g) of the headset 100/1100, the display highlighting may be updated to reflect whether the current headset settings match any of the defined presets.

Using the adjust mix interface illustrated in FIG. 4, the user can adjust the sliders representing the three volume levels. Any changes to the sliders 414 are immediately sent to the headset's controller 102. Slider positions may be at a lower resolution than the API parameters. The slider values may be mapped to/from parameter settings via lookup tables.

A slider which is On (unmuted) may be displayed in a different color than a slider which is Off (muted). As illustrated in FIG. 4, sliders include: "audio", "ambient", "voice." A numeric value (not shown) may be displayed adjacent to each slider to indicate the current slider value. Tapping right/left the slider dot increments/decrements the slider value. Touching and dragging a slider updates the associated slider value.

A speaker icon (not shown) adjacent to each slider may indicate the On/Off (unmuted/muted) state. Tapping the speaker icon may toggle the On/Off (unmuted/muted) state. All dynamic aspects of the screen may be updated accordingly. Button presses on the headset 100/1100 (e.g., 103, 1103a to 1103g) will likewise move the sliders 414 on the edit panel. An AVRCP volume messages may also affect the Source Slider position and be sent to the headset's controller 102.

A text box for the preset name may allow editing of the preset slide names. Saving with a new name adds a new preset. Saving over an existing name overwrites the existing preset.

The Return, Reset, Save, and Delete Preset buttons (not shown) may available on the adjust mix page. Activation of the Return button (Back arrow) causes the application to leave the new settings active in the headset 100/1100, but does not modify the preset. The Return button returns the application to the previous screen. Return may represented by a Back arrow.

Activation of the "Reset" button restores the previous/stored settings by sending them back to the headset 100/1100. The displayed screen stays on the adjust mix edit page. The sliders are updated to match the levels of the reset levels. The Reset button may also be dynamic, with the text changing color when the current display settings match the stored preset, in comparison to when the display settings do not match the current preset values.

Activation of the "Save" button modifies the preset, storing the new/current values (which should already be active on the headset 100/1100). The Save button may flash as a save animation. The display stays on the adjust mix edit page. Pressing this button may cause the Reset button to turn change color, as the displayed and stored settings now match.

Activation of the "Delete Preset" causes the application to display a warning popup on display 402: "Warning Are you sure you wish to delete this mix?" Cancel/Delete. On selection of cancel, the application returns to the previous display state with no change. On delete, the application may display a pop up message that the settings have been saved message and return to an earlier display screen.

The application may provide additional screens/interfaces to provide information about other devices. For example, an Amazon Alexa configuration page may provide information about a connected Alexa device, and an option to enable/disable the Alexa services. Alexa is an intelligent personal assistant developed by Amazon made popular by the Echo. Alexa is capable of voice interaction, music playback, making to-do lists, setting alarms, streaming podcasts, playing audiobooks, and providing weather, traffic and other real time information. Alexa can also control several smart devices using itself as a home automation hub. Most devices with Alexa allow users to activate the device using a wake-word (such as Alexa).

Each headset 100/110 may have a unique identifier from which individual headsets may be identified. The software application on the device 401 may query the headset 100/1100 for its unique identifier so as to distinguish between different headsets, and provide interfaces tailored to the functionality of a particular headset.

For data management, the application may maintain a number of active settings as well as a number of preset settings. A parameter set is a group of the three volume levels for the headset. Active parameter sets represent those in use on the headset 100/1100. At any time there are three sets of parameters stored on the headset 100/1100: one set for use during HFP-connected telephone calls, and one set for normal audio operation, and one set for a quick access "chat mode" preset. The active settings must be considered to be volatile, since the headset 100/1100 has buttons which can change these parameters. Active settings must be read from the headset 100/1100 before being modified.

Preset parameter sets may be stored on the device 401 and can be sent to the headset 100/1100. The telephone preset may be a special/dedicated preset which can only be loaded when in a telephone call. The telephone preset should be sent to the connected headset 100/1100 only on pressing of the telephone call preset while a phone call is established. This preset can only be modified while in an active HFP phone call using the headset 100/1100. The name of the telephone preset cannot be modified and will always show at the top of the preset list.

The quick "chat mode" preset is a special case audio preset which can be selected at any time. It is essentially a special case of either audio or phone mode. If the user selects the quick preset, the quick access parameters may be sent to the headset 100/1100. This will trigger the state machine of the controller 102 to enter quick "chat" mode and will result in an associated notification from the headset. The name of the quick "mode" preset cannot be modified and will always show as second in the preset list (similar to the way that telephone call preset is handled).

All other presets are user presets and can be modified, including their name. The application will start with a few predefined presets to get the user started.

Preset Data includes a source state, a source level, an ambient state, an ambient level, a voice state, and a voice level. The source state may be used to indicate whether the Bluetooth audio source is muted. 1=On/unmuted, 0=Off/muted. The source level (corresponding to value 126 in FIG. 1) indicates the source volume range from 0 to 127. Steps are 1 dB each, with 0=minimum volume, and 127=maximum volume. The source level slider positions may be mapped to API values, such as mapping slider positions of 0 to 16 to the range of source level values, and vice-versa.

The ambient state indicates if the ambient microphones are muted. 1=On/unmuted, and 0=Off/muted. The ambient level (corresponding to value 168 in FIG. 1) indicates the ambient volume range from 0 to 127. Steps are 0.375 dB each, with 0=minimum volume, and 127=maximum volume. The ambient level slider positions may be mapped to API values, such as mapping slider positions of 0 to 16 to the range of source level values, and vice-versa.

The voice state indicates if the voice feedback microphone 182*c* is muted, with 1=On/unmuted, and 0=Off/muted. The voice level (corresponding to value 128 in FIG. 1) indicates the voice volume range from 0 to 127. Steps are 1 dB each, with 0=minimum volume, and 127=maximum volume. Voice level slider positions may be mapped to API values, such as mapping slider positions of 0 to 16 to the range of source level values, and vice-versa.

When a telephone call connection is established, the application saves the current screen and jumps to an adjust mix screen with the phone call preset set as the mode selection. The application queries the controller 102 to read the current telephone call settings stored in storage 194 on the headset 100/1100. The sliders 414 on the display 402 reflect the values read from the headset 100/1100, with the mode selection 412 indicating "Phone Calls."

The Reset button may be highlighted if the values do not match the stored preset, or another color if they are a match. Pressing the Reset button will recall the stored telephone call preset values and send them to the headset 100/1100. When the telephone call ends, the software may revert the interface on the display 402 back to the previous (before the call) screen. If the user navigates to another screen during the telephone call, that should become the "previous" screen.

The headset 100/1100 can be switched into the quick "chat mode" preset through a button (103) press on the headset. When this occurs the application will receive a state event notification from the controller 102. On receipt of the quick state notification, the application may save the current screen and jump to an adjust mix screen with the quick "chat mode" preset values displayed by the sliders 414*b* to 414*d*.

The application reads the current quick "chat mode" settings from the headset 100/1100 by querying the controller 102 or receiving a notification from the controller, displaying the adjust mix screen for "chat mode" on display 402 (e.g., as shown in FIG. 4). The sliders and display reflect the values read from the headset 100/1100.

The reset button may be highlighted if the displayed values do not match the stored preset, and another color if they are a match. Pressing the reset button will cause the software to recall the quick preset values stored on the device 401 and send them to the controller 102 of the headset 100/1100.

When the quick "chat mode" state ends, the controller 102 sends a notification to the software application running on the device 401. In response, the software causes the interface on the display 402 to revert back to the previous (before the quick state change) screen. If the user navigates to another screen during the quick state, that other screen becomes the "previous" screen.

Selecting any other audio setting from the preset mode selection list functions as usual for that other mode. Receipt of these audio settings by the controller 102 may terminate the quick chat mode in the headset 100/1100 and a notification of the state change may be sent by the controller 102 to the software application on the device 401.

When the application on the device 401 is pushed to the background, it saves the last screen it was on. When returning to the foreground, the application should return to the page it was previously on. If disconnected, the application should re-establish a connection 490 to the headset 100/1100 as transparently as possible, and read current settings from the attached headset. The display 402 may be updated per the current headset level settings (since buttons 103 and/or 1103a to 1103g on the headset 100/1100 may have been pressed while the application was sleeping).

Bluetooth AVRCP volume messages may be used to affect the source volume level 126 as set in the circuitry 101/DSP 1110. Changes to the source volume level 126 result in corresponding changes at the connected device 401 via AVRCP messages from the controller 102. In other words, a Bluetooth AVRCP volume message received by the controller 102 causes the controller 102 to set the source level 126. Changes to the source level 126 on the headset should result in corresponding changes at the connected device 401 via AVRCP messages from the controller 102 to the device 401.

The controller 102 of the headset 100/1100 may send a variety of notifications to the software application on the device 401. Some of these notifications may be in response to the application's own requests, but others may be asynchronous events occurring in the headset 100/1100 such as button presses. The application may log these events. Application functionality may also be extended through the use of these event notifications (e.g. to support Alexa).

The headset 100/1100 may provide an API which enables complex extended functionality to be added through the software application on the mobile device 401. Such functionality may work through event triggers and notification messages. The controller 102 of the headset may have no knowledge or logic related specifically to these extended functions.

Voice transactions based on spoken utterances may use two-way voice communications, and may be implemented using Bluetooth HFP profile. Upon a wake word or speech command trigger, the application will set up an HFP session with the headset 100/1100 and begin listening for a user/wearer utterance request over the headset microphone 182c. Received utterances may be processed by software on the device 401, or sent to a speech processing service (e.g., server(s) 497 in FIG. 4) for interpretation. Responses from the speech processing software may be sent back to the headset 100/1100 over the same HFP session.

Music (i.e., the audio source selected by signal 124) may be muted and/or paused during a voice transaction. Music may not resume until the transaction is completed and A2DP has been re-established. A transaction may have multiple segments. The HFP session may be maintained for the complete transaction.

Voice transactions are preferably smooth and natural. Since various mobile devices 401 will have different latencies related to handling of speech, the application may listen for a period of silence to indicate the user has finished speaking. The application may confirm that the HFP channel is receiving before sending audio to the headset 100/1100. Ideally the feedback will pause if the user is speaking to avoid a double-talk scenario.

Timing-based transitions for general state changes may be variable across devices 401 and may be inconsistent and unreliable. Signal detection may be used as the input for transition control. Timeouts may be implemented to prevent the system from hanging at any point during the transaction.

The software application on device 401 may support playback of music through a remote service such as Amazon's Alexa, when a headset 100/1100 is connected by the Bluetooth A2DP profile. If the A2DP profile is not connected or drops, then the software application may pause the music channel. The software application 401 may include the decoders necessary to convert streaming media received from a remote media server 498 into the format suitable for transmission to the headset 100/1100.

The software application may be designed to minimize phone consumption on device 401. A low power mode may be implemented which disables the down channel to the remote speech processing service (server(s) 497). The low power mode may be user selectable through a menu option.

The low power mode may be activated automatically if the battery level of the mobile device 401 drops below a threshold percentage (e.g., 10%). Upon connection to a charger, or power cycling of the mobile device 401, the low power mode will be exited if the user has not manually set the software application for the low power operation.

The controller 102 and software application on the device 401 communicate using a communications API. The following describes an example of a message protocol for the headset 100/1100.

Three message types may be supported: Set, Get, Notify, Output, & ACK. Notify messages may also be considered to be Response/Reply messages. All messages will have the following format: <msg type> <len> <param0> <param1> [<param2> <data0> [ . . . <datan>]]

The field <msg type> is a char8 ASCII character determining the message type where valid. Example values for application to headset messages include: 's'= Set parameter message, 'g'= Get parameter message, 'o'= GPIO output message, and 'a'= ACK of notification message. Example values for headset to software application messages include: 'n'= Notify or Response message.

The field <len> is a uint8 value containing the total # of bytes in this message. The fields <param0>, <param1>, <param2> are char8 bytes which determine the parameter(s) to be accessed. The fields [<data0> [ . . . <datan>]] when present are the parameter values where type is specific to the parameters accessed.

A "Set" message allows a connected software application on device 401 to change parameters in the headset 100/1100. Response to a Set message is through notification of the requested change.

A "Get" message allows a connected application on device 401 to query the headset 100/1100 for current parameter settings in the headset. Response to a Get message is through a notification with the requested values.

Notification messages inform a connected application of the current state of the headset 100/1100. Notification messages from the controller 102 may be sent as a response to commands by the application on device 401, or as a result of changes in the headset due to user actions, state changes, or other asynchronous events.

The application on the device 401 may respond to all notification messages with an ACK message. The ACK message may include the first 4 bytes of the notification message as payload data.

The controller 102 sends parameter change notifications to inform the application on device 401 of current parameter values in the headset. These may be requested by the application, or sent based on changes occurring in the headset. Parameters include Source, Ambient, Voice, Battery levels; Source, Ambient, Voice Mute states, etc.

The controller 102 may send button events to inform the application of all button presses occurring in the headset. A message field <btnID> is a bitmask indicating which of the buttons was activated, and may also indicate that the connection detection signal 108 has been asserted. Another message field <btnType> may be used by the controller 102 to enumerate button press types:

```
{ INVALID = 0,                          // invalid button timing
  SHORT = 1,                            // A short button press occurred
  LONG = 2,                             // A long button press occurred
  VERY_LONG = 3,                        // A very long button press occurred
  DOUBLE = 4,                           // A double press occurred
  REPEAT = 5,                           // Button has been pressed & held
  LOW_TO_HIGH = 6,                      // Low to high transition occurred
  HIGH_TO_LOW = 7,                      // high to low transition occurred
  SHORT_SINGLE = 8,                     // a short press & release occurred
  LONG_RELEASE = 9,                     // button released after a long press
  VERY_LONG_RELEASE = 10,               // button released after a very long press
  VERY_VERY_LONG = 11,                  // a very-very long press occurred
  VERY_VERY_LONG_RELEASE = 12,          // button released after a very-very long press
  TRIPLE = 13,                          // a triple button press occurred
  PATTERN = 14                          // a button pattern has occurred }
```

In the case of a button pattern, multiple messages may be sent and received in conjunction with the pattern, indicating that a sequence occurred in a short time period. Sequences are repeatable and are identifiable by the software application on device 401 based on determining that multiple messages have been received sequentially and/or within a threshold amount of time, determining which button-press messages have been received, and determining that the button presses indicated by the series of messages corresponds to a specific button combination.

Messages from the application on the device 401 may cause the controller 102 to trigger a user interface change on the headset, such as changing a state of an LED 1105 or activating the vibration element 1104. The application may also send messages specifically instructing the controller 102 to toggle a state of a headset user interface feature (e.g., an LED 1105, a vibrator 1104), the pulse width for activation and/or deactivation, and the number pulses in an on-off sequence.

Table 2 illustrates examples of communication messages used by the API for the software application on device 401 to communicate messages to the controller 102:

TABLE 2

| \<msg type\> | \<len\> | \<param0\> | \<param1\> | \<param2\> | Value | Range | Description |
|---|---|---|---|---|---|---|---|
| 's' | 6 | 'L' | 'S' = Source<br>'A' = Ambient<br>'V' = Voice | 'A' = Audio<br>'P' = Phone<br>'Q' = Quick | (uint8) | 0 = minimum<br>127 = maximum<br>Steps = 1 dB | Set Level value |
| 's' | 6 | 'M' | 'S' = Source<br>'A' = Ambient<br>'V' = Voice | 'A' = Audio<br>'P' = Phone<br>'Q' = Quick | (bool) | 0 = playing<br>1 = muted | Set Mute State |
| 'g' | 5 | 'L' | 'S' = Source<br>'A' = Ambient<br>'V' = Voice | 'A' = Audio<br>'P' = Phone<br>'Q' = Quick | N/A | | Get Level value Request |
| 'g' | 5 | 'M' | 'S' = Source<br>'A' = Ambient<br>'V' = Voice | 'A' = Audio<br>'P' = Phone<br>'Q' = Quick | N/A | | Get Mute State Request |
| 'g' | 5 | 'B' | 'A' | 'N' | N/A | | Get Battery Value Request |
| 'g' | 5 | 'S' | 'I' | 'N' | N/A | | Get SysInfo Request |
| 'g' | 5 | 'A' | 'P' | 'A' = Audio<br>'P' = Phone<br>'Q' = Quick | N/A | | Get Audio Parameters (as a block) Request |
| 'o' | 9 | 'G' | 'P' | 'N' | \<io\><br>\<Ton\><br>\<Toff\><br>\<Cnt\> | | GPIO output trigger |
| 'a'* | 9 | 'C' | 'K' | 'N' | \<command\><br>\<clen\><br>\<Param0\><br>\<Param1\> | | Acknowledge message |

Table 3 illustrates examples of communication messages used by the API for the controller 102 to communicate messages to the software application on device 401 to communicate with the controller 102:

TABLE 3

| <msg type> | <len> | <param0> | <param1> | <param2> | Value | Range | Description |
|---|---|---|---|---|---|---|---|
| 'n' | 6 | 'L' | 'S' = Source<br>'A' = Ambient<br>'V' = Voice | 'A' = Audio<br>'P' = Phone<br>'Q' = Quick | (uint8) | 0 = minimum<br>127 = maximum<br>Steps = 1 dB | Notify Level Change |
| 'n' | 6 | 'M' | 'S' = Source<br>'A' = Ambient<br>'V' = Voice | 'A' = Audio<br>'P' = Phone<br>'Q' = Quick | (bool) | 0 = playing<br>1 = muted | Notify Mute State Change |
| 'n' | 6 | 'B' | 'A' | 'N' | (uint8) | 0 = minimum<br>255 = maximum | Notify Battery Level |
| 'n' | 7 | 'E' | 'B' | 'A' = Audio<br>'P' = Phone<br>'Q' = Quick | <btnID><br><btnType> | | Notify Event Button Press |
| 'n' | 6 | 'E' | 'R' | 'A' = Audio<br>'P' = Phone<br>'Q' = Quick | <errCode> | 0 = mode (param2) is invalid | Notify invalid request from app |
| 'n' | 11 | 'A' | 'P' | 'A' = Audio<br>'P' = Phone<br>'Q' = Quick | <data0><br><data1><br><data2><br><data3><br><data4><br><data5> | Source Mute<br>Source Level<br>Ambient Mute<br>Ambient Level<br>Voice Mute<br>Voice Level | Notify Audio Parameters (as a block) |
| 'n' | 6 | 'E' | 'S' | 'A' = Audio<br>'P' = Phone<br>'Q' = Quick | <ovState> | 0 = Sleep<br>1 = A2DP<br>2 = Idle<br>3 = Phone<br>4 = Recognition<br>5 = QuickSet<br>6 = LineIn | Notify Event System State change |
| 'n' | 5 | 'H' | 'B' | 'N' | | | Periodic heartbeat message |
| 'n' | 32 | 'S' | 'I' | 'N' | (char) string[27] | HHHHHHHH FFFFFFFF SSSSSSSSSS\0 | Notify System Information |

Table 4 illustrates examples of system data used by the API for the controller 102 to communicate messages to the software application on device 401 to communicate with the controller 102:

TABLE 4

| | |
|---|---|
| HHHHHHHH = 'HW_00_01' | 8 char hardware revision |
| FFFFFFFF = 'FW_00_00' | 8 char firmware revision |
| SSSSSSSS = 'SN01234567' | 10 char Serial Number |
| '\0' | Null string terminator |
| "HW_00_01FW_00_00SN01234567" | Full String as received |

The controller 202 may generate audio prompts. The audio prompts may be recorded audio prompts stored in storage 194 and/or generated as tones using a tone generator. Audio prompts may be, for example, audio samples stored as 8 kHz adaptive differential pulse-code modulation (ADPCM) samples.

Audio prompts are mixed into the stereo audio path at the controller 102 by setting the source select signal 124 to select the controller 102 as the source, setting the source level 126 to a level set for prompts, and outputting the audio prompt via the multiplexer 116 into the stereo audio path. This may be done by the controller 102 independent of the state machine's mode of operation. When not in HFP or A2DP mode, the state of the source select signal 124 may default to Source 1 to allow playback of prompts through the stereo audio path. In the auxiliary mode, where the source select signal 124 is set to Source 2 (the audio I/O link 107), the controller 102 may send an $I^2C$ message to cause the $I^2C$ interface 1122 to switch the multiplexer 116 to select $I^2S$ input from controller 102 via the $I^2S$ interface 1112 while the audio prompt is playing, and then send an additional message to cause the $I^2C$ interface 1122 to switch the multiplexer 116 back to line input (Source 2) from the audio I/O link 107.

Volume-change or level-change prompts may play a volume prompt, with a source level 126 gain value applied. The gain value applied may be taken from a dedicated prompt volume table. The same table can be applied to all volume related prompts. The index for the prompt gain table may be the same as the index for the current level setting. Table 5 illustrates examples of voice prompts and their triggering events, where the files are stored in storage 194:

TABLE 5

| | Triggering Event | Wave File | ADPCM file | Prompt Phrase |
|---|---|---|---|---|
| 1 | Power On | Onvocal_Power On.wav | 0.prm | tones |
| 2 | Power Off | ONvocal_Power Off.wav | 1.prm | tones |

TABLE 5-continued

| | Triggering Event | Wave File | ADPCM file | Prompt Phrase |
|---|---|---|---|---|
| 3 | Enter Pairing | ONvocal_Pair Search.wav | 2.prm | "Pairing" |
| 4 | Pairing Successful | Onvocal_Paired.wav | 3.prm | "Now Paired" |
| 5 | Low Battery | Onvocal_Battery Low.wav | 4.prm | tones |
| 6 | Unused Event 7 | Onvocal_Ambient Off 6db.wav | 5.prm | "Ambient Off" |
| 7 | Unused Event 3 | Onvocal_Ambient On 6db.wav | 6.prm | "Ambient On" |
| 8 | Unused Event 1 | Onvocal_Voice On 6db.wav | 7.prm | "Voice On" |
| 9 | Unused Event 8 | Onvocal_Voice Off 6db.wav | 8.prm | "Voice Off" |
| 10 | Mute Off | Onvocal_Mute Off.wav | 9.prm | "Mute Off" |
| 11 | Mute On | Onvocal_Mute On.wav | 10.prm | "Mute On" |
| 12 | A2DP Vol Max | Onvocal_Double Volume.wav | 11.prm | double beep |
| 13 | Volume Down | Onvocal_vol_3.wav | 12.prm | tone with volume |
| 14 | Volume Up | Onvocal_vol_3.wav | 13.prm | tone with volume |
| 15 | Ambient | Onvocal_vol_3.wav | 14.prm | tone with volume |
| 16 | Voice Long/Hold | Onvocal_vol_3.wav | 15.prm | tone with volume |

The circuitry 101 in headsets 100 and 1100 includes the controller 102, which may include one-or-more central processing unit (CPU) for processing data and computer-readable instructions, and a memory 195 for storing data and instructions. The memory 195 may include volatile random access memory (RAM), non-volatile read only memory (ROM), non-volatile magnetoresistive (MRAM) and/or other types of memory. The circuitry 101 may also include a data storage component 194, for storing data and controller/processor-executable instructions (e.g., instructions to perform the algorithms illustrated in FIG. 2). The data storage component 194 may include one or more non-volatile storage types of solid-state storage such as flash memory, phase-change memory, or MRAM. The circuitry 101 may also be connected to removable or external non-volatile memory and/or storage (such as a removable memory card, memory key drive, networked storage, etc.) through the data port 1106 or via a wireless connection (e.g., storage on server(s) 497/498, storage on device 401, etc.). Included DSP(s), such as DSP 1110 in FIG. 11, may share storage 194 and memory 195 with controller 102 and/or have DSP-dedicated storage and memory (not illustrated) that configures the DSP(s) to perform some or all of the signal processing discussed in connection with FIGS. 1, 5, 7, 8, 9, and 11.

Computer instructions for operating the headsets 100 and 1100, and their various components, may be executed by the controller 102 and included DSPs (e.g., DSP 1110), using the memory 195 or memories as temporary "working" storage at runtime. The computer instructions may be stored in a non-transitory manner in non-volatile memory (e.g., 194), storage (e.g., 195), or an external device. Alternatively, some or all of the executable instructions may be embedded in hardware or firmware in addition to or instead of software.

As discussed above and illustrated in FIG. 11, the DSP 1110 may used for signal processing of microphones, control of source level volume (in accordance with the source level value 126 set by the controller 102), and control of voice feedback volume level (in accordance with the voice level value 128 set by the controller 102). The executable code for the DSP 1100 may be the same for all operating modes of the state machine of the controller 102, and may be loaded at a POWER_ON event in the controller 102. Parameter changes are made with the DSP 1110 running. Changes to gain level of the vocal pickup microphone 182c may also be made by I²C message to the DSP 1110. The driver 1164 is preferably initialized after the DSP 1110 at a POWER_ON event in the controller 102. Ambient volume levels are adjusted by I²C messages to the I²C interface 1166 in the driver 1164. A system Mute/Unmute function is preferably implemented using the driver 1164.

The examples are meant to be illustrative. They were chosen to explain the principles and application of the disclosure and are not intended to be exhaustive nor to limit the disclosure. Many modifications and variations of the disclosed aspects may be apparent to those of skill in the art. Persons having ordinary skill in the field of digital signal processing, and sound reception beamforming and spatial filter, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The disclosed system may be implemented in whole or in part as a computer method or as an article of manufacture such as a memory device or non-transitory computer readable storage medium. The computer readable storage medium may be readable by a computer and may comprise instructions for causing a digital processor or other device to perform processes described in the present disclosure. The computer readable storage medium may be implemented by a volatile computer memory, non-volatile computer memory, hard drive, solid-state memory, flash drive, removable disk and/or other media. In addition, the state machine described in connection with controller 102 may be implemented as firmware or in hardware. For example, at least the state machine may be implemented as an application specific integrated circuit (ASIC), a digital signal processor (DSP), a field programmable gate array (FPGA), or some combination thereof.

As used in this disclosure, the term "a" or "one" may include one or more items unless specifically stated otherwise. Further, the phrase "based on" is intended to mean "based at least in part on" unless specifically stated otherwise.

What is claimed is:

1. A headset comprising:
   a wearable frame;
   a first and a second headphone channels connected to the wearable frame, each of the first and second headphone channels comprising a speaker and a microphone;
   a vocal pickup microphone connected to the wearable frame;
   a button switch that generates a control signal when actuated;

a signal mixer that mixes and outputs an audio signal to the speakers of the first and second headphone channels;

a controller that sets a Voice volume level for a voice signal from the vocal pickup microphone input into the signal mixer, a Source volume level for communications or media audio signals input into the signal mixer, and an Ambient volume level for ambient sound signals from the microphones of the first and second headphone channels input into the signal mixer; and a memory that stores a first set of parameter values for the Voice, Source and Ambient volume level values;

a beam former that receives output signals from the vocal pickup microphone and the microphone of at least one of the first and second headphone channels, and outputs the voice signal, the beam former configured to provide directional speech isolation, at least partially isolating the voice signal from other sound signals picked up by the vocal pickup microphone;

a low pass filter configured to cut-off frequencies at a cut-off frequency in the output signal from the microphone of at least one of the first and second headphone channels, the cut-off frequency being less-than-or equal to an upper limit of the frequency range for human speech;

a finite impulse response (FIR) filter, receiving a second output signal from the low pass filter; and a summer that subtracts an output signal of the FIR filter from an output signal of the microphone of at least one of the first and second headphone channels;

wherein in response to receiving a first occurrence of the control signal, the controller changes the first set of parameter values for the Voice, Source, and Ambient volume levels to a second set of parameter values that are different from the first set of parameter values, and wherein in response to receiving a second occurrence of the control signal following the first occurrence, the controller restores the Voice, Source, and Ambient volume levels to the first set of parameter values.

2. The headset of claim 1, further comprising:

a Voice volume level control interface for signaling the controller to adjust the Voice volume level;

a Source volume level control interface for signaling the controller to adjust the Source volume level; and an Ambient volume level control interface for signaling the controller to adjust the Ambient volume level, wherein the controller adjusts the first set of parameter values in response to receiving signaling from the Voice, Source, and/or Ambient volume level control interfaces while the first set of parameters are used for the Voice, Source, and Ambient volume levels, and wherein the controller adjusts the second set of parameter values in response to receiving signaling from the Voice, Source, and/or Ambient volume level control interfaces while the second set of parameters are used for the Voice, Source, and Ambient volume levels.

3. The headset of claim 1, further comprising a wireless radio transceiver configured to support a communication link with a device, wherein the controller adjusts the second set of parameter values in response to receiving one or more changes to the second set of parameter values from a software application executed on the device.

4. The headset of claim 3, wherein the headset receives the communications or media audio signals from the device via the communication link, wherein further in response to receiving the first occurrence of the control signal, the controller sends a first message to the device to pause playback of media corresponding to the media audio signals or to mute communications corresponding to the communications audio signals, and wherein further in response to receiving the second occurrence of the control signal the controller sends a second message to the device to resume playback or unmute communications.

5. The headset of claim 1, wherein:

the memory includes non-volatile memory storage storing the second set of parameter values, wherein the second set of parameter values configure the Voice and Ambient volume levels so that at least a portion of one or more of the voice signal and the ambient sound signals are included in the output audio signal from the signal mixer.

6. A method comprising:

setting, in accordance with a first set of parameters, a Voice volume level for a voice signal from a vocal pickup microphone, a Source volume level for communications or media audio signals, and an Ambient volume level for ambient sound signals from at least one headphone microphone, the vocal pickup microphone and the at least one headphone microphone being part of a headset including headphone speakers;

mixing the voice signal, the communications or media audio signals, and the ambient sound signals within the headset to produce a mixed audio signal;

storing the first set of parameters in a memory/storage;

directionally isolating, by a beam former, the voice signal by inputting an output signal from the vocal pickup microphone and the at least one headphone microphone, the beam former configured to at least partially isolate the voice signal from other sound signals picked up by the vocal pickup microphone cutting off, by a low pas filter, frequencies at a cut-off frequency in the output signal from the microphone of at least one of the first and second headphone channels, the cut-off frequency being less-than-or equal to an upper limit of the frequency range for human speech;

receiving, by a finite impulse response (FIR) filter, a second output signal from the low pass filter;

subtracting, by a summer, an output signal of the FIR filter from an output signal of the microphone of at least one of the first and second headphone channels;

outputting the mixed audio signal to the headphone speakers of the headset;

in response to receiving a first occurrence of a control signal, changing the Voice, Source, and Ambient volume levels in accordance with a second set of parameters different than the first set of parameters; and in response to receiving a second occurrence of the control signal, restoring the Voice, Source, and Ambient volume levels in accordance with the first set of parameters.

7. The method of claim 6, further comprising:

adjusting the first set of parameter values in response to receiving signaling from Voice, Source, and/or Ambient volume level control interfaces while the first set of parameters are used for the Voice, Source, and Ambient volume levels, the headset comprising the Voice, Source, and Ambient control interfaces, and adjusting the second set of parameter values in response to receiving signaling from the Voice, Source, and/or Ambient volume level control interfaces while the second set of parameters are used for the Voice, Source, and Ambient volume levels.

8. The method of claim 6, further comprising:
receiving one or more changes to the second set of parameter values from a software application executed on a device connected to the headset via a wireless link; and
adjusting the Voice, Source, and Ambient volume levels of the second set of parameter values in accordance with the received one or more changes.

9. The method of claim 8, further comprising:
displaying, by the software application, an interface to adjust the Voice, Source, and Ambient volume levels on a touch-sensitive display of the device;
receiving an input via the interface to change one or more of the Voice, Source, and Ambient volume levels; and
transmitting the change from the device to the headset.

10. The method of claim 6, further comprising:
receiving the communications or media audio signals via a wireless link from a device.

11. The method of claim 10, further comprising:
sending a first message over the wireless link to the device to pause playback of a media corresponding to the media audio signals or to mute the communications corresponding to the communications audio signals, further in response to receiving the first occurrence of the control signal, and
sending a second message over the wireless link to the device to resume playback or unmute the communications, further in response to receiving the second occurrence of the control signal.

12. The method of claim 6, wherein when the second set of parameter values are used, at least some of the voice signal and the ambient sound signals are included in the mixed audio signals output to the headphone speakers.

13. A headset comprising:
a wearable frame;
a switch that generates a control signal when actuated;
first and second headphone channels connected to the wearable frame, each of the first and second headphone channels comprising a speaker and a microphone, to be positioned adjacent to a respective first or second ear of a person when wearing the headset;
a vocal pickup microphone connected to the wearable frame, to pick up voice data from the person when wearing the headset;
a first variable gain amplifier that receives source signals comprising media audio signals or audio communications signals, and applies a source gain to the source signals in accordance with a Source volume level value to produce a gain-adjusted source signal;
a second variable gain amplifier that receives the voice data and applies a voice gain to the voice data in accordance with a Voice volume level value;
a third variable gain amplifier that receives an ambient sound signal from the microphones of the first and second headphone channels and applies an ambient gain to the ambient sound signals in accordance with an Ambient volume level value;
a mixer that combines the gain-adjusted source signals, the gain-adjusted voice data signal, and the gain adjusted ambient sound signals to produce an output, the speakers of the first and second headphone channels reproducing sound based on the output from the mixer;
a controller that sets the Source, Voice, and Ambient volume level values in accordance with a current mode of operation of the headset, the headset having a plurality of modes of operations;
a memory/storage that stores a first set of Source, Voice, and Ambient volume level values;
a beam former that receives an output signal from the vocal pickup microphone and the microphone of at least one of the first and second headphone channels, and outputs the voice data signal, the beam former configured to provide directional speech isolation, at least partially isolating the voice data from other sound signals picked up by the vocal pickup microphone;
a low pass filter configured to cut-off frequencies at a cut-off frequency in the output signal from the microphone of at least one of the first and second headphone channels, the cut-off frequency being less-than-or equal to an upper limit of the frequency range for human speech;
a finite impulse response (FIR) filter, receiving a second output signal from the low pass filter; and
a summer that subtracts an output signal of the FIR filter from an output signal of the microphone of at least one of the first and second headphone channels;
wherein, in response to receiving a first occurrence of the control signal, the controller changes the Source, Voice, and Ambient volume level values from a first set of values to a second set of values; and
in response to receiving a second occurrence of the control signal following the first occurrence, the controller restores Source, Voice, and Ambient volume level values to the first set of values.

14. The headset of claim 13, wherein the FIR filter is configured so that a combined signal delay caused by the low pass filter and the FIR filter is approximately equal to a time difference of arrival for the voice data between the vocal pickup microphone and the microphone of at least one of the first and second headphone channels.

* * * * *